US010008026B2

(12) United States Patent
Murray et al.

(10) Patent No.: US 10,008,026 B2
(45) Date of Patent: Jun. 26, 2018

(54) APPARATUS FOR, AND METHOD OF, RENDERING IMAGE DATA

(71) Applicant: Toshiba Medical Systems Corporation, Otawara-shi (JP)

(72) Inventors: Andrew Murray, Edinburgh (GB); Magnus Wahrenberg, Edinburgh (GB)

(73) Assignee: Toshiba Medical Systems Corporation, Otawara-shi (JP)

( * ) Notice: Subject to any disclaimer, the term of this patent is extended or adjusted under 35 U.S.C. 154(b) by 7 days.

(21) Appl. No.: 13/946,346

(22) Filed: Jul. 19, 2013

(65) Prior Publication Data

US 2015/0022523 A1   Jan. 22, 2015

(51) Int. Cl.
*G06T 15/08* (2011.01)
(52) U.S. Cl.
CPC .................... *G06T 15/08* (2013.01)
(58) Field of Classification Search
CPC .......... G06T 15/08; G06T 15/06; G06T 15/02
See application file for complete search history.

(56) References Cited

U.S. PATENT DOCUMENTS

2011/0069070 A1* 3/2011 Engel ............................ 345/426

FOREIGN PATENT DOCUMENTS

CN   102024271 A   4/2011
JP   2003-24330    1/2003

OTHER PUBLICATIONS

Heewon Kye, et al., "Interactive classification for pre-integrated volume rendering of high-precision volume data", Graphical Models, 70, 2008, pp. 125-132.
Byeonghun Lee, "Fast High-Quality Volume Ray-Casting with Virtual Samplings", IEEE Transactions on Visualization and Computer graphics, vol. 16, No. 6, Nov./Dec. 2010, pp. 1525-1532.
Toshiya Hachisuka, et al., "Multidimensional Adaptive Sampling and Reconstruction for Ray Tracing", ACM Transactions on Graphics (TOG)-Proceedings of ACM SIGGRAPH, vol. 27, issue 3, article No. 33, Aug. 2008, 10 pages.
Combined Chinese Office Action and Search Report dated Oct. 8, 2016 in Patent Application No. 201410342376.0 with English translation of categories of cited documents.

* cited by examiner

*Primary Examiner* — Abderrahim Merouan
*Assistant Examiner* — Phuc N Doan
(74) *Attorney, Agent, or Firm* — Oblon, McClelland, Maier & Neustadt, L.L.P.

(57) ABSTRACT

Image rendering apparatus for rendering an image from a set of image data representing a volume, the apparatus comprises a rendering unit configured to perform a sampling process that comprises determining values of opacity for a plurality of sample positions along a specified path through the volume; at least one of a) determining values of color/grayscale for the plurality of sample positions along the specified path, b) determining gradient values for a plurality of gradient positions along the specified path; and determining whether there is a transition to or from a high opacity state, and if there is a transition to or from a high opacity state modifying at least pad of the sampling process, wherein the rendering unit is further configured to process the determined values of opacity, color/grayscale and/or gradient to determine a pixel value for a pixel of the image.

24 Claims, 29 Drawing Sheets

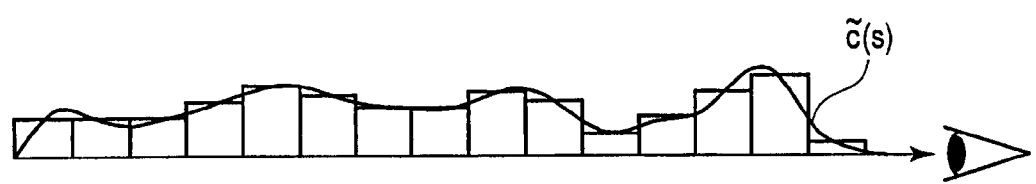
F I G. 1

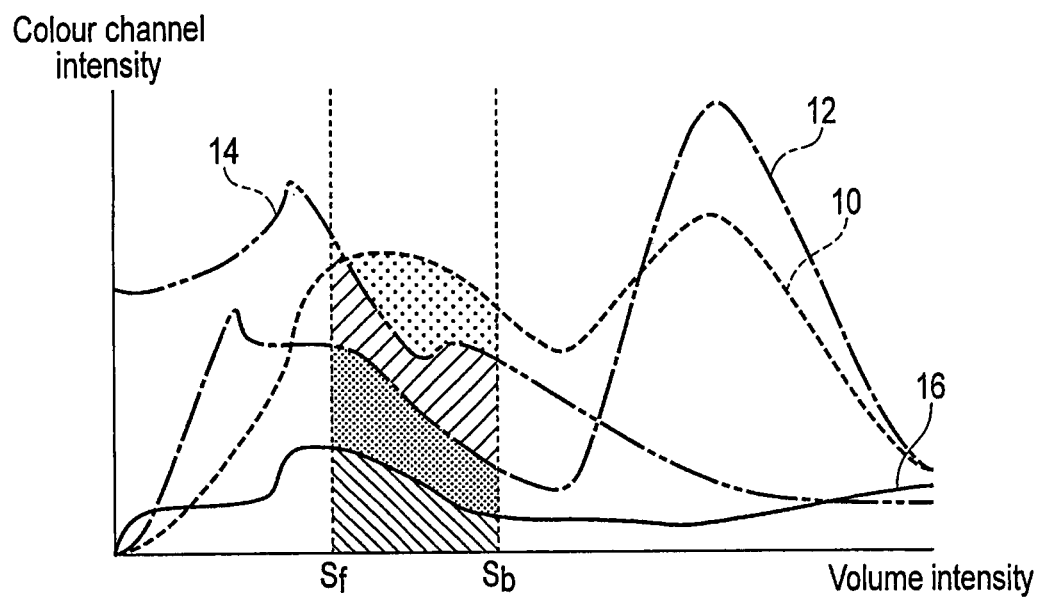
F I G. 2A
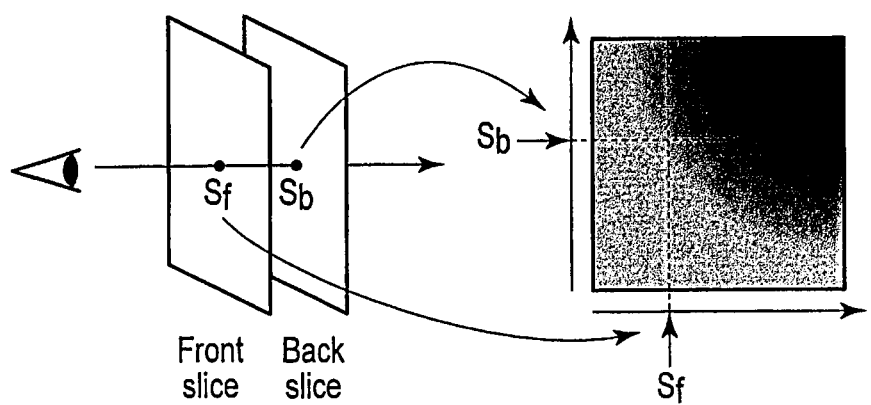
F I G. 2B

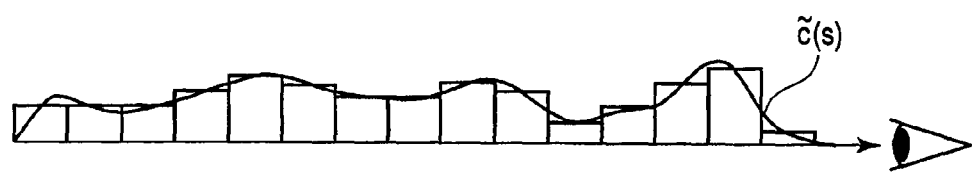
F I G. 3A
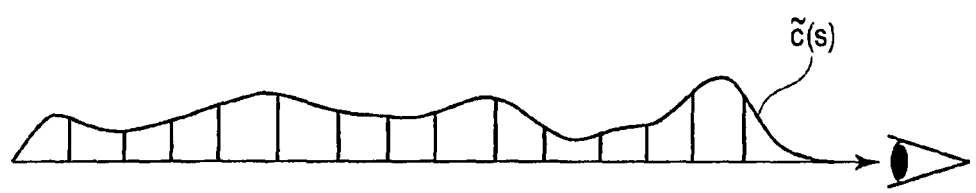
F I G. 3B

F I G. 4A
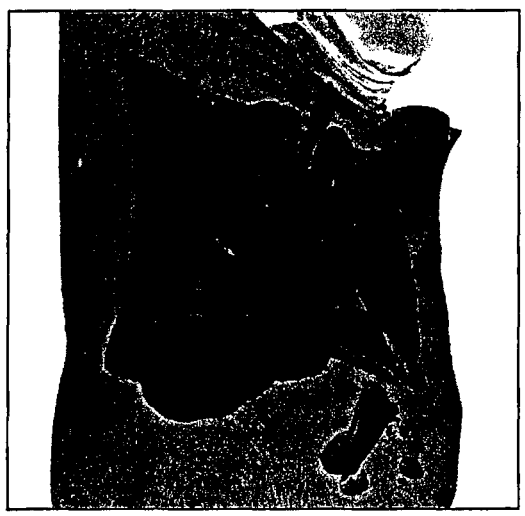
F I G. 4B

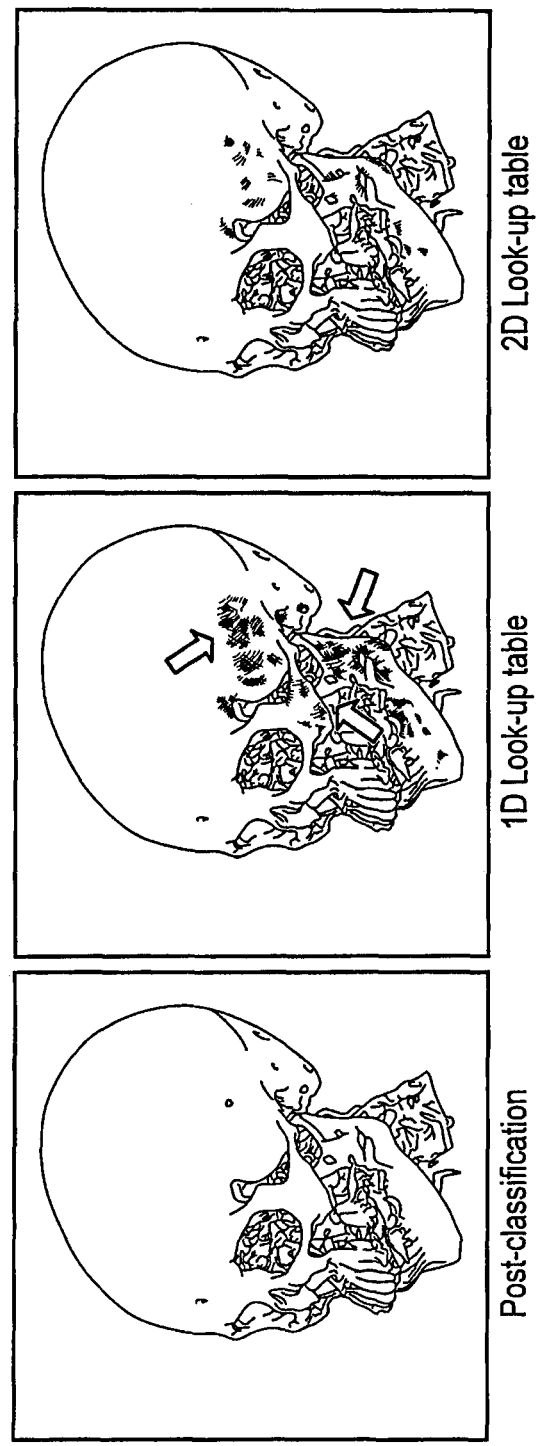

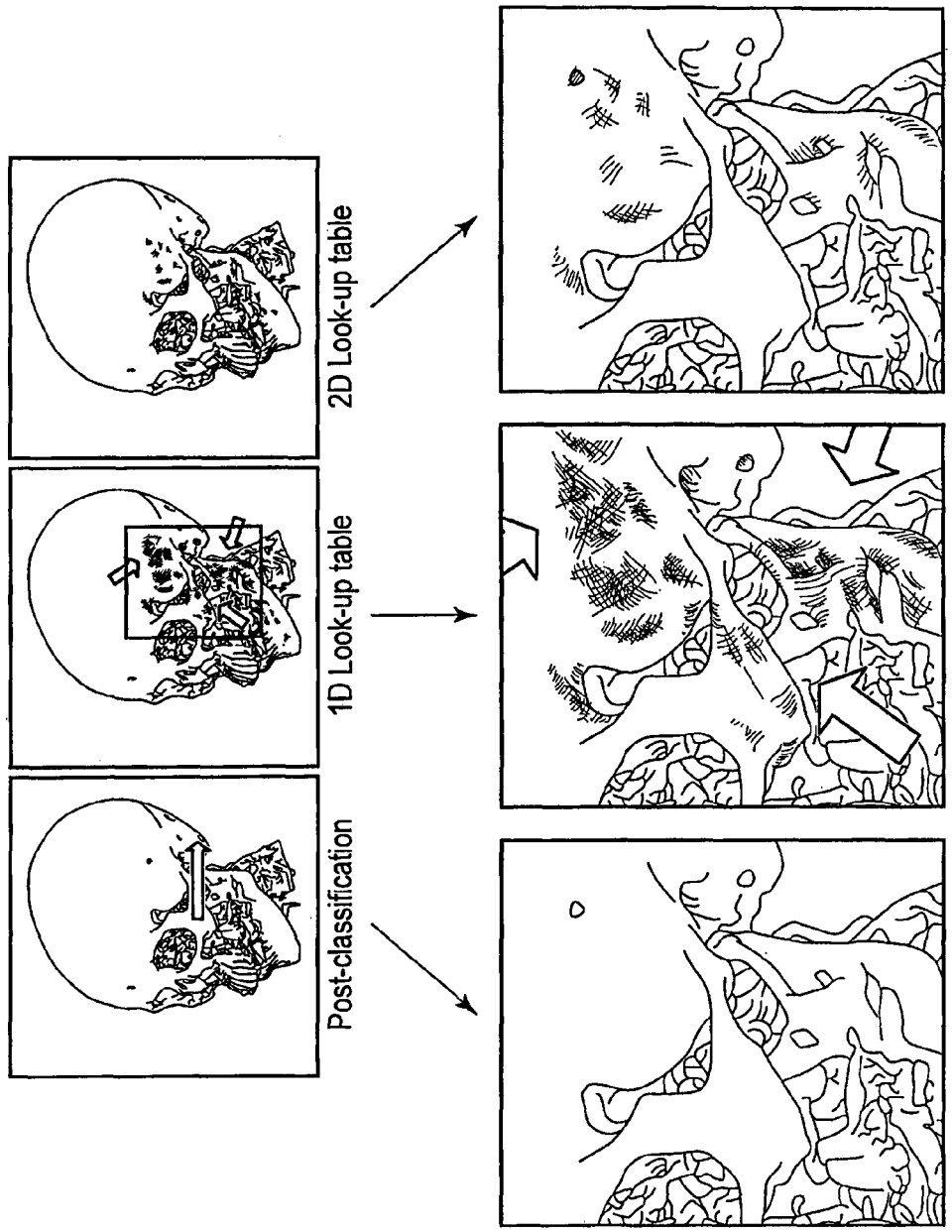
F I G. 8C
F I G. 8B
F I G. 8A

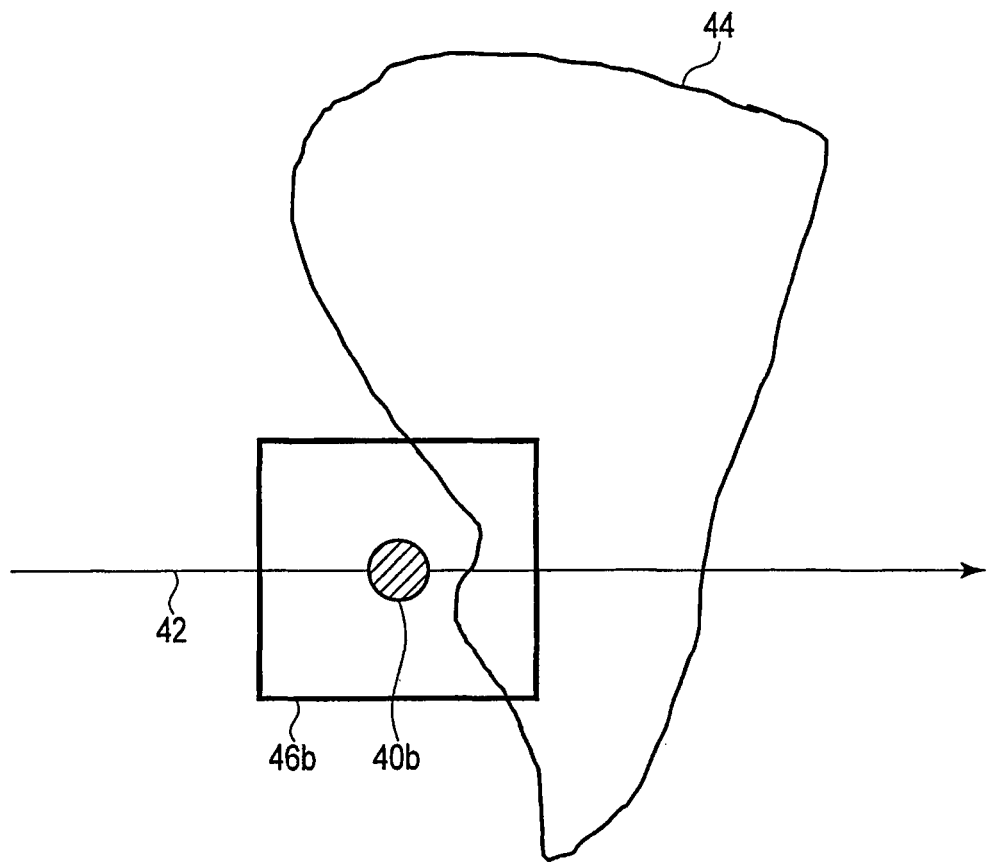
F I G. 9B

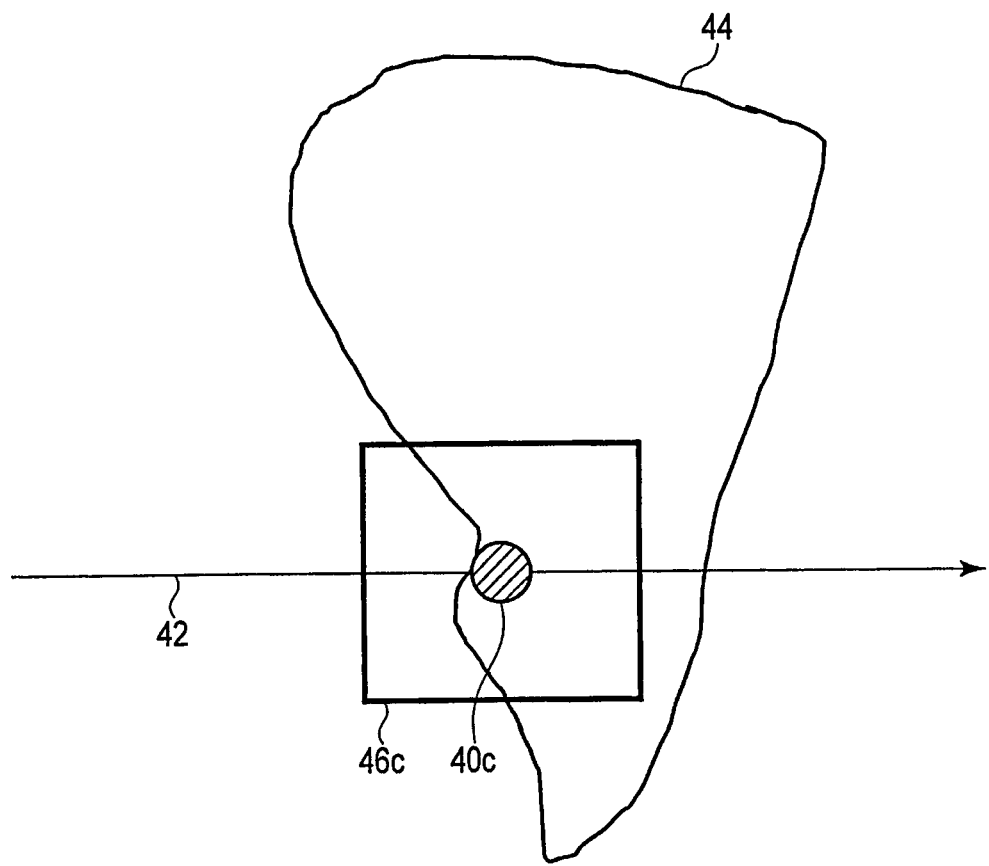
F I G. 9C

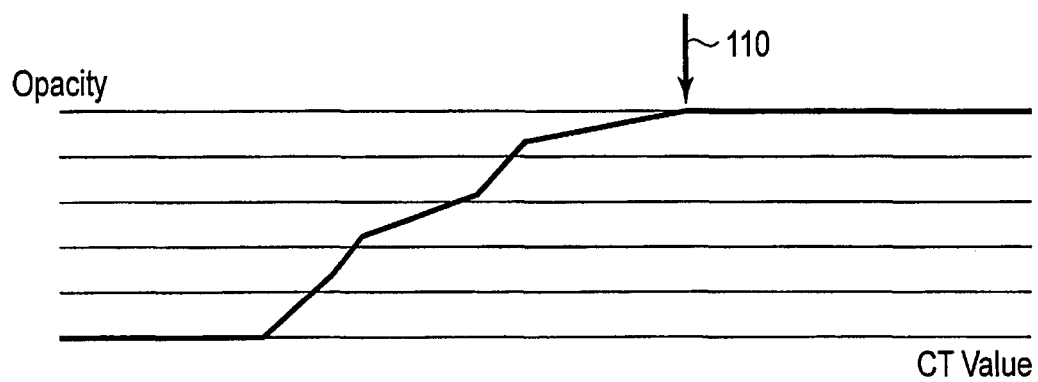
F I G. 12

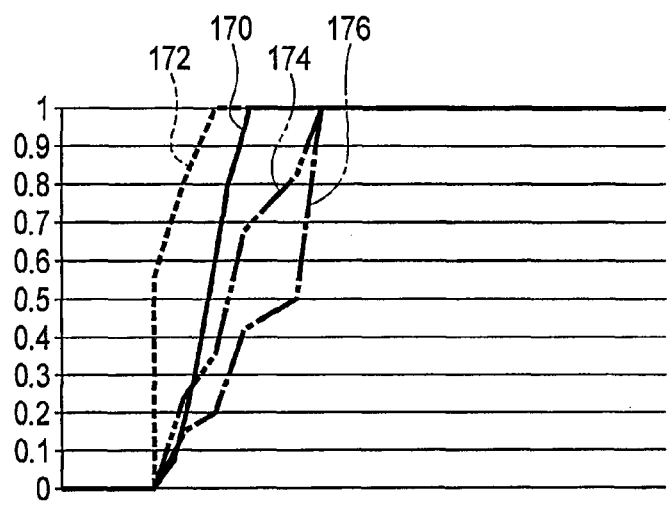
F I G. 17
 
F I G. 18A   F I G. 18B

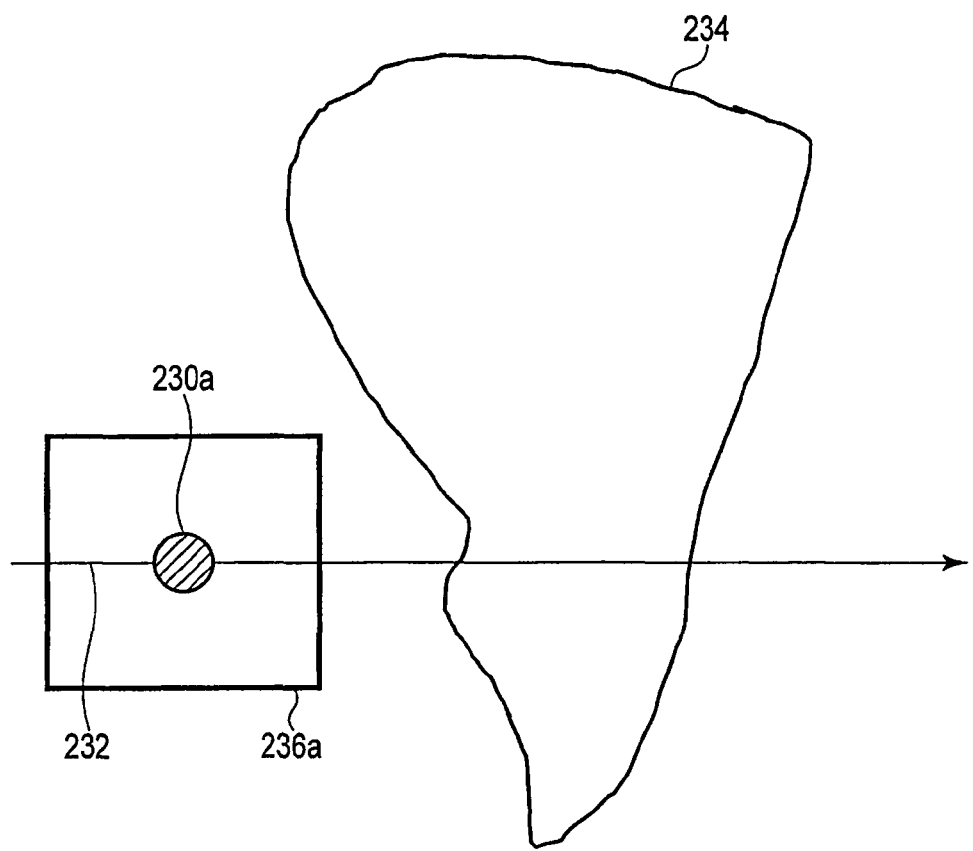
F I G. 20

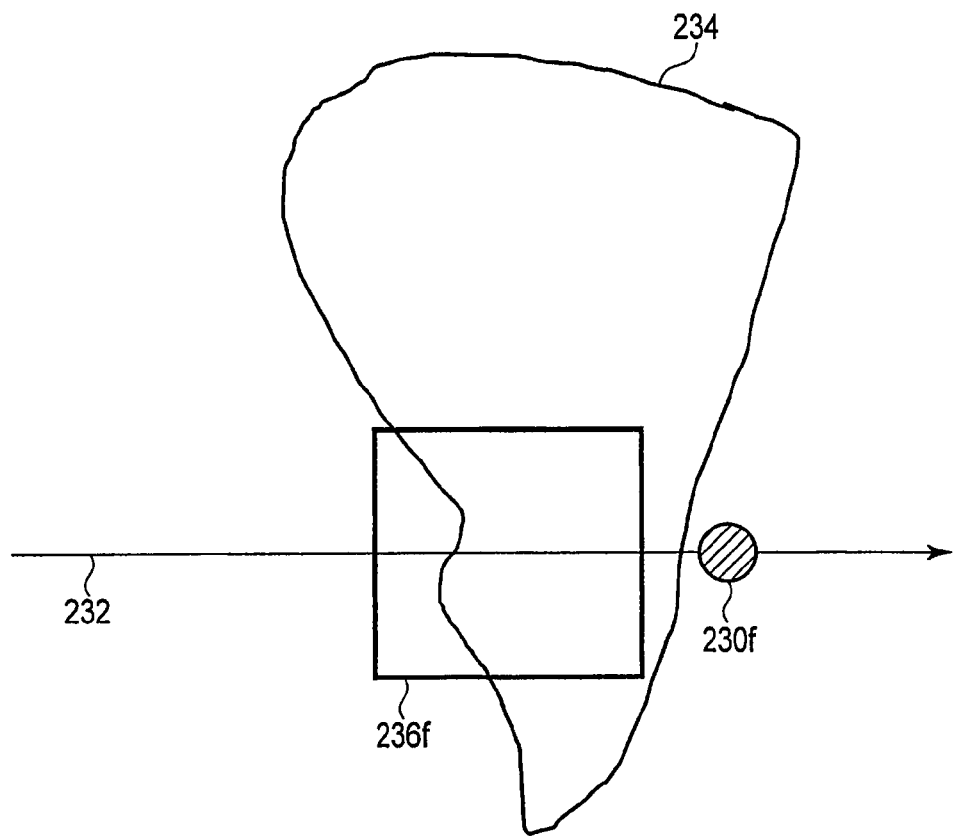
F I G. 25

APPARATUS FOR, AND METHOD OF, RENDERING IMAGE DATA

FIELD

The present invention relates to an apparatus for, and method of, rendering volumetric image data, for example volumetric medical image data.

BACKGROUND

Volumetric medical imaging techniques that can produce three-dimensional medical imaging data using any of a variety of imaging modalities, for example CT, PET, MRI, ultrasound, and X-ray, are now widely used for imaging or diagnostic purposes.

Volumetric medical imaging data may comprise a three-dimensional array of voxels, each voxel representative of a particular position in three-dimensional space and each voxel having one or more data values. For example in the case of CT data, each voxel may comprise an intensity value representative of the attenuation of the applied X-ray radiation provided at the location represented by the voxel, for example the attenuation of the part of a patient's anatomy present at that location.

A wide variety of rendering techniques are known that are used to process volumetric image data in order to display a desired representation of a patient or other subject. For example, the volumetric image data may be rendered to display a two-dimensional projection of the three dimensional volumetric data. The two-dimensional projection may include desired texture or shading effects, and may provide an impression of a surface in three dimensions to the viewer.

Commonly used volume rendering techniques use a transfer function to map each of a series of sampled voxel values to an opacity value and a colour value (usually represented by a combination of red, green and blue colour values). In ray casting and similar techniques, for each pixel in the 2D projection an imaginary ray is cast from the perspective of the viewer through a corresponding point on a two-dimensional imaginary image plane and through the volume represented by the volumetric image data.

The full volume rendering integral can be complex to evaluate accurately in real time. Therefore, it is known to fall back to a simple numerical approach of sampling c(s) (the colour of the sample) in discrete steps along rays cast through the volume, as illustrated schematically in FIG. 1. For a series of (usually equally spaced) sample points along the ray path through the volume, the transfer function can be used to assign opacity and colour values to the sampled points. A process is then performed to combine the colour and opacity values of the sampled points in sequence along the ray path to produce a single colour value for that pixel.

If, for example, the opacity of the first sampled point is high, as determined by the transfer function based on the measured intensity value for that point, then the colour of the corresponding pixel should be determined entirely, or almost entirely, by the colour value for that sampled point, as the imaginary ray effectively does not penetrate into the volume beyond that initial high opacity point. If the opacity values of the first points in the series of sampled points are relatively low then the colour of the corresponding pixel should be determined from a combination of the colour values for those sampled points in the series up to the point where the accumulated opacity reaches a sufficiently high value.

The simple sampling approach illustrated in FIG. 1 can be vulnerable to volatility in the transfer function and in the data sampled. An alternative known approach uses a pre-integration approach, which can go some way to account for volatility in the transfer function and in the data samples the renderer receives. Pre-integration is a technique that involves using colours that are pre-computed for the sample interval, with the results of the computations being stored in a 2-D look-up table (front-sample, back-sample) as illustrated schematically in FIGS. 2a and 2b. Corresponding opacity and colour values for each possible pair of intensity values and sample spacings are pre-computed using the transfer function and stored in the look-up table.

For each successive pair of samples along the ray path, indicated as front slice (Sf) and back slice (Sb) in FIGS. 2a and 2b, the renderer looks up the pre-computed colour and opacity value from the 2-D look-up table that corresponds to that pair of sampled intensity values and that sample spacing.

FIG. 2a is a representation of the transfer function, including red 10, green 12, blue 14 and opacity ($\alpha$) 16 channels. The intensities of the particular sampled points, Sf and Sb, are indicated in FIG. 1a by dashed lines. Rather than calculating colours and opacities for each of the Sf and Sb separately and then including in a resulting integration process, in the pre-integration approach the opacity value and colour value for the pair of values at the sampled points Sf and Sb can be read directly from the 2D look-up table. The 2D look-up table is represented graphically in FIG. 2b as a 2D intensity plot. Effectively, the approach presumes that for each pair of sampled intensity values, the intensity varies linearly (or in some other specified way) in the interval between the sampled points, and thus the stored value in the look-up table for a particular pair of sampled intensity values can be considered to represent averaged opacity and colour values of the transfer function for the range of intensities between the two sampled intensity values.

The use of the 2D pre-integration can turn the estimate provided by the sampling approach of FIG. 1 (shown again in FIG. 3a) to a smoother estimate, as illustrated schematically in FIG. 3b, although very noisy data can still cause inaccuracies. Effectively, each block is now replaced by a pre-computed integral of the transfer function (between the two samples). This computation is subject only to the sampling rate and the transfer function, independent of the volume data, the viewing angle and all other rendering parameters. The 2D pre-integration approach effectively provides a slab-by-slab rendering process rather than slice-by-slice rendering process for each pixel, and thus can provide a smoothing to counteract volatility in the transfer function and in the data sampled.

The simple numerical sampling approach, for example as described with reference to FIG. 1, can lead to artefacts such as the tree ring artefacts shown in FIG. 4a that results from a thin skin layer going un-sampled in particular areas due to the discretization of the simple numerical approach. The 2D pre-integration approach captures the skin detail more accurately, as shown in FIG. 4b.

One limitation of the 2D pre-integration approach is that precise 2D pre-integration can consume too much memory. For example, for the range of a 16 bit unsigned integer a floating point RGBA representation costs 128 bits×$65536^2$=64 gigabytes. Even before combining that requirement with the memory and processing requirements associated with any segmentation (which may require one transfer function per object) that usually represents an unacceptable burden.

The compute time for 2D pre-integration approaches can also be long. The nature of the integral involves many slow-to-compute procedures such as power functions ($x^y$). This computation also has to be redone for every change in the sampling rate, usually left to the control of the application developer.

For many practical purposes, such as medical imaging applications for use by medical practitioners, speed and memory requirements are significant factors. Medical practitioners, such as doctors, radiologists, nurses and radiographers, do not expect to wait significant periods of time for rendered images to be produced, indeed they may expect such renderings to be produced almost instantaneously using processing resources available on a desktop terminal. Furthermore, medical practitioners commonly wish to change rendering parameters, leading to changes in transfer functions, or navigate through images whilst they are viewing. Again, the medical practitioner does not usually expect to wait for any significant periods of time for new renderings to be produced following such changes.

It has been proposed to adopt a 1D pre-integration approach, based on a 1D look-up table to approximate the functionality of the 2D pre-integration approach whilst reducing memory and processing burdens. One example of such a 1D approach is described in H. Kye et al, Interactive Classification for Pre-Integrated Volume Rendering of High-Precision Volume Data, Graphical Models, 70 (2008), 125-132.

In 1D approaches such as that of H. Kye et al, the look-up table contains values of colour and opacity that are pre-computed as corresponding to each possible value of measured image data (for example, each possible measured intensity value). In some cases the 1D table may have lower resolution than the measured image data (for example it may store entries only for integer intensity values) but stored values may be interpolated if desired. Effectively, the 1D table may be considered to store colour and opacity values pre-computed using the transfer function for pairs of sampled intensity values, similar to the 2D approach, but in this case one of the intensity values of the pair is set always to be at zero or some other common value.

It should be noted that in some cases the 1D look-up table may consist of two associated 1D look-up tables, for example two interleaved 1D look-up tables, which one table stores a series of cumulative integrals between 0 and a series of image data values (e.g. intensity values) and the other table stores the reverse cumulative integrals between infinity (or a maximum value) and the series of image data values (e.g. intensity values).

The 1D approaches described in the preceding two paragraphs can fit within memory limitations as it is only necessary to store a table as large as the classifier being used. Computation times are also generally shorter than with the 2D approach as the computations involved are summations rather than exponentials, which are faster to compute. The image quality provided by the 1D approaches can also be better than that provided by the simple sampling approach of FIG. 1.

However, known 1d approaches such as that of H. Kye et al generally use an approximation of the opacity of the sampled colour which is inaccurate for high opacity. The graphs of FIGS. 5a and 5b are contour plots of estimated opacity as a function of original opacity (x-axis) and ray step-size (y-axis) for accurate step-size weighted opacity (FIG. 5a) and for the approximation used in the 1D method (FIG. 5b). It can be seen that for values of opacity close to 1.0 (approaching complete opacity) the plots are more different, i.e. the approximation used in the 1D method is worse and providing too high transparency (too low opacity) compared to the true situation.

The effects of the faulty opacity approximation for high opacity values can be seen, for example, in FIG. 6 of H. Kye et al, Interactive Classification for Pre-Integrated Volume Rendering of High-Precision Volume Data, Graphical Models, 70 (2008), 125-132, in which the transfer function is set up to render the skin of a subject and the 1D method renders the skin more transparent than it should be, resulting in a different view that, undesirably in this case, renders internal structure such as bone. The computed opacity for a region in 1D methods may, for example, be representative of an average of the opacity within the region—thus a region containing an opaque interval and a non-opaque interval is assessed as non-opaque.

The faulty opacity approximation for high opacity values in 1D methods can also, more subtly, result in a different colour being rendered than should be the case if the opacity was approximated more accurately. That effect can be understood with reference to FIG. 6 of the present application, which represents a transfer function as a plot of opacity 20 and red 22, green 24 and blue 26 colour values as a function of intensity. In this case, if at one of the sample points (indicated by arrow 30 in FIG. 6) the value of intensity from the image data had an intensity value slightly greater than the value of intensity at which opacity first reaches a value of 1.0 according to the transfer function (indicated by arrow 28 in FIG. 6) then the resulting colour produced will have greater green and blue values than should be the case.

As mentioned above, in the 1D approach the pre-computed values of a opacity, and red, green and blue stored in the look up table for a particular sampled value of intensity are effectively an average of the values of opacity and red, green and blue obtained from the transfer function for all intensity values up to the sampled value. There may also be stored in the look-up table pre-computed values of opacity, and red, green and blue stored that are effectively an average of those values from the transfer function for all intensity values from infinity or a maximum value down to the sampled value. In the example of FIG. 6, the stored opacity and red, green and blue values in the look up table for the intensity 30 of the sample point will include contributions from points on the transfer function after point 28 when the opacity first reaches its maximum value of 1.0. However, in reality light would not penetrate beyond point 28, as the subject is considered to be completely opaque at that point. Therefore, in the example of FIG. 6 the resulting colour will be more green and blue than expected due to the fact that the pre-rendering process effectively samples behind something that is opaque and continues to pick up erroneous colour contributions as a result.

An alternative approach uses adaptive sampling, in which sampling is performed at a higher rate in high gradient areas. However, this approach generally fails to capture high frequencies in the transfer function, and can also reduce performance much more than expected because it interferes with parallelisation/prediction models and other assumptions involved in current rendering techniques.

Known rendering processes often provide shading and lighting effects in the rendered images as well as setting colour or greyscale to an appropriate value for each pixel. Such shading and lighting effects are usually provided by specifying the location of one or more imaginary light sources and then, as part of the rendering process, determining the effect of the light source(s) on the brightness of each pixel in the rendered image. The appropriate shading, represented for example by pixel brightness level, for each pixel is usually determined by analysing surface orientation around each of the sample points along the ray path through the volume for that pixel. A gradient volume (for instance a 4×4×4 voxel volume) may be defined around each sample point and a known gradient determination process is performed based on the intensity values for each of the voxels in the gradient volume. The resulting gradient values for the sampled points are then included in the subsequent integral process that combines the colour, opacity and, in this case, gradient values of the sampled points in sequence along the ray path to produce a single colour and shading/brightness value for that pixel.

As noted above, known 1D pre-integration approaches to sampling can produce approximation errors that can cause the opacity approximations for high opacity values to be underestimated. Effectively, such opacity approximation errors can allow the imaginary ray to progress too far along the ray path, which can cause interference from near lying surfaces when determining local gradients for use in the shading/brightness rendering. Even small traversal errors can result in catastrophic shading errors in some cases.

Shading errors resulting from underestimation of opacity in 1D methods are illustrated by way of example in FIGS. 7a to 7c, which show images of a skull rendered using a classification method such as that described in relation to FIG. 1 (FIG. 7a), rendered using a 1D look-up table method (FIG. 7b) and rendered using a 2D look-up table method (FIG. 7c). Hand-drawn arrows in FIG. 7b point towards regions of the image that include artefacts comprising unwanted texture features due to the under-estimation of opacity in the 1D look-up table method. Magnified parts of the images are shown in FIGS. 8a to 8c.

The errors in the rendered images due to the underestimation of opacity for high opacities in the 1D look-up table methods can also be understood with reference to FIGS. 9a to 9d. FIG. 9a is a schematic illustration showing a sample point 40a along the path 42 of an imaginary ray cast through a volume represented by imaging data, for example a set of voxels of CT imaging data. The imaging data comprises a region 44 of high-intensity (and high opacity according to the transfer function in this case) with all other regions being of low intensity (and thus low opacity according to the transfer function in this case). A gradient volume 46a around the sampling point 40a is indicated in FIG. 9a. Voxels within the gradient volume 46a are included in a gradient calculation process to determine the orientation of any surfaces. The gradient data resulting from the gradient calculation process is associated with the sample point 40a and is included in a subsequent integral process that combines the colour, opacity and, in this case, gradient values of a series of sampled points 40a-40d in sequence along the ray path 42 to produce a single colour and shading/brightness value for a pixel of the ultimate rendered image.

FIGS. 9b to 9d show a series of further sample points 40b-40d as the sampling moves along the ray path 42. For each of the sampling positions, opacity and colour data is obtained from the 1D look-up table, and gradient data is obtained by processing intensity data for voxels within the gradient volume 46b-46d for that sampling position.

It can be seen that the sample point 40c has reached the high opacity region 44 in FIG. 9c. The ray should, ideally, terminate at that point as, due to the high opacity of region 44, the accumulated opacity for the series of sample points is such that the ray should not be able to penetrate further (in this example, it can be noted that the accumulated opacity is equal to the opacity at point 40c due to the low opacity at the preceding points 40a, 40b).

However, as the 1D look-up table underestimates the opacity for high opacity regions, the sample point progresses to the next position 40d, as shown in FIG. 9d. At that sample point 40d a further iso-surface of the region 44 enters the gradient volume 46d, thus affecting the calculation of the gradient data for that sample position 40d and so causing a shading error in the pixel in the ultimate rendered image corresponding to that ray path 42.

BRIEF DESCRIPTION OF THE DRAWINGS

Embodiments are now described, by way of non-limiting example, and are illustrated in the following figures, in which:—

FIG. 1 is a schematic representation of a sampling along a ray path through a volume;

FIG. 2a is a representation of a transfer function;

FIG. 2b is a representation of a 2D look-up table mapping pairs of sampled intensities to opacity and/or colour;

FIGS. 3a and 3b are further schematic representations of samplings along a ray path through a volume;

FIGS. 4a and 4b are rendered images according to numerical sampling and 2D pre-integration approaches;

FIGS. 7a to 7c and 8a to 8c are images rendered using pre-classification, 1D look-up table and 2D look-up table techniques;

FIGS. 9a to 9d are schematic illustrations showing a succession of sample points and associated gradient regions along a ray path;

FIG. 12 is a representation of a further transfer function;

FIG. 17 is a representation of a further transfer function;

FIGS. 18 and 18b are rendered images obtained using a known rendering method and obtained used a process described in relation to FIG. 13;

FIGS. 20 to 25 are schematic illustrations showing a succession of sample points and associated gradient regions along a ray path.

DETAILED DESCRIPTION

According to an embodiment there is provided image rendering apparatus for rendering an image from a set of image data representing a volume, the apparatus comprising a rendering unit configured to perform a sampling process that comprises: determining values of opacity for a plurality of sample positions along a specified path through the volume; at least one of a) and b):— a) determining values of colour/grayscale for the plurality of sample positions along the specified path;

b) determining gradient values for a plurality of gradient positions along the specified path; and determining whether there is a transition to or from a high opacity state, and if there is a transition to or from a high opacity state modifying at least part of the sampling process, wherein the rendering unit is further configured to process the determined values of opacity, colour/grayscale and/or gradient to determine a pixel value for a pixel of the image.

According to an embodiment there is also provided a method of rendering an image from a set of image data representing a volume, the method comprising: performing a sampling process that comprises determining values of opacity for a plurality of sample positions along a specified path through the volume; at least one of a) and b):— a) determining values of colour/grayscale for the plurality of sample positions along the specified path;

b) determining gradient values for a plurality of gradient positions along the specified path; and determining whether there is a transition to or from a high opacity state, and if there is a transition to or from a high opacity state modifying at least part of the sampling process; and processing the determined values of opacity, colour/grayscale and/or gradient to determine a pixel value for a pixel of a rendered image.

According to an embodiment there is also provided an apparatus for processing image data representing a volume, the apparatus comprising a pre-rendering unit configured to obtain a transfer function, to determine a position of at least one transition to or from a high opacity region according to the transfer function, and to store at least one marker representative of the determined position of said at least one transition to or from a high opacity region.

Figure 5A:
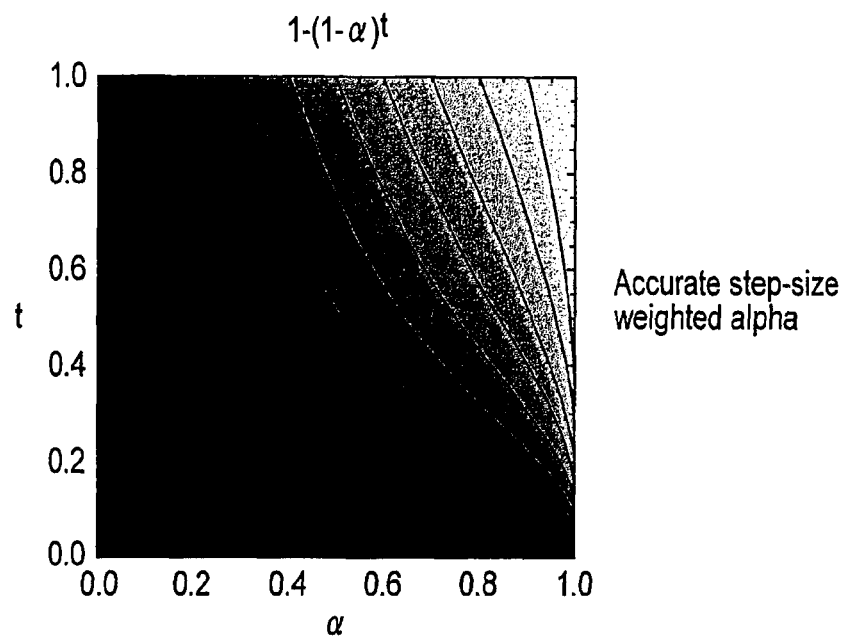
FIGS. 5a and 5b are contour plots of estimated opacity as a function of actual opacity and ray-step size for accurate step-size weighted opacity and for an approximation used in a known 1D pre-integration method.
Figure 5B:
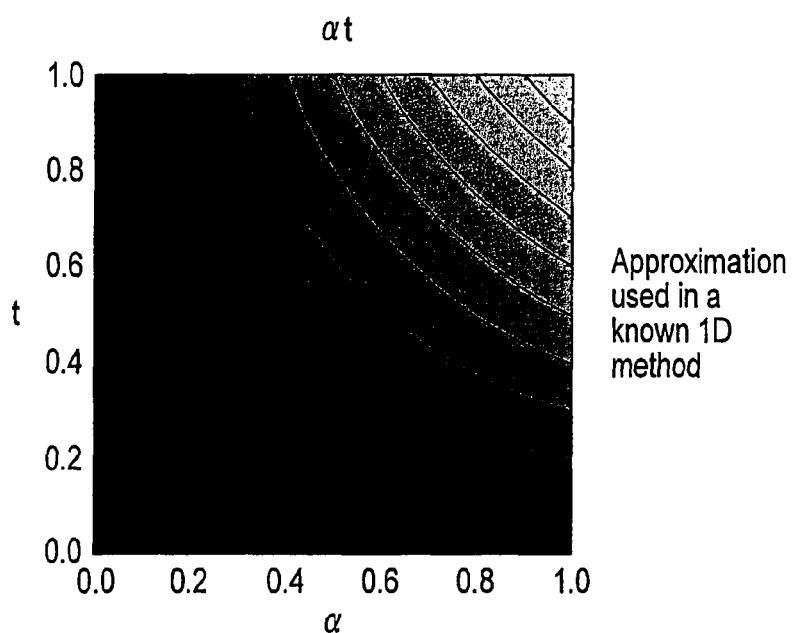
Figure 6:
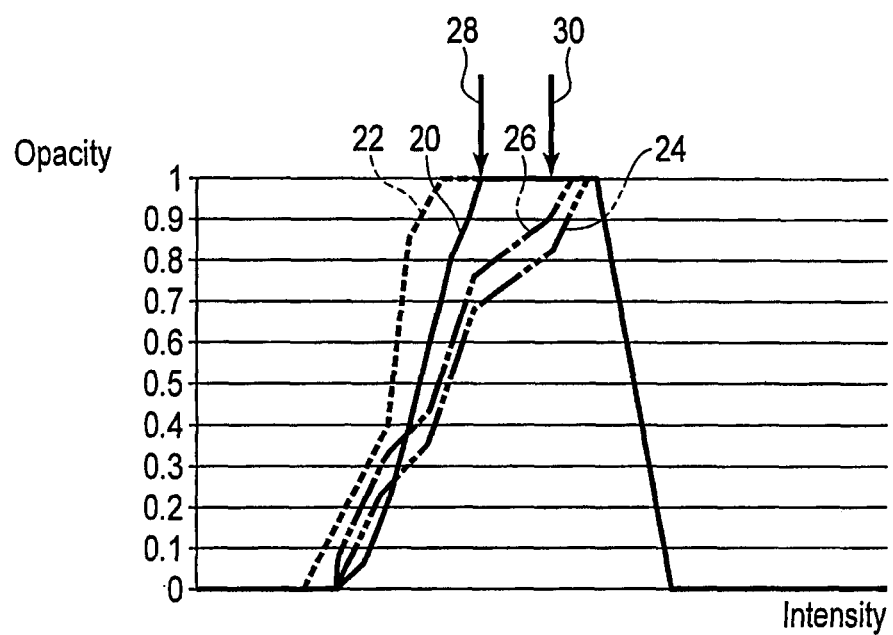
FIG. 6 is a representation of a further transfer function.
Figure 9A:
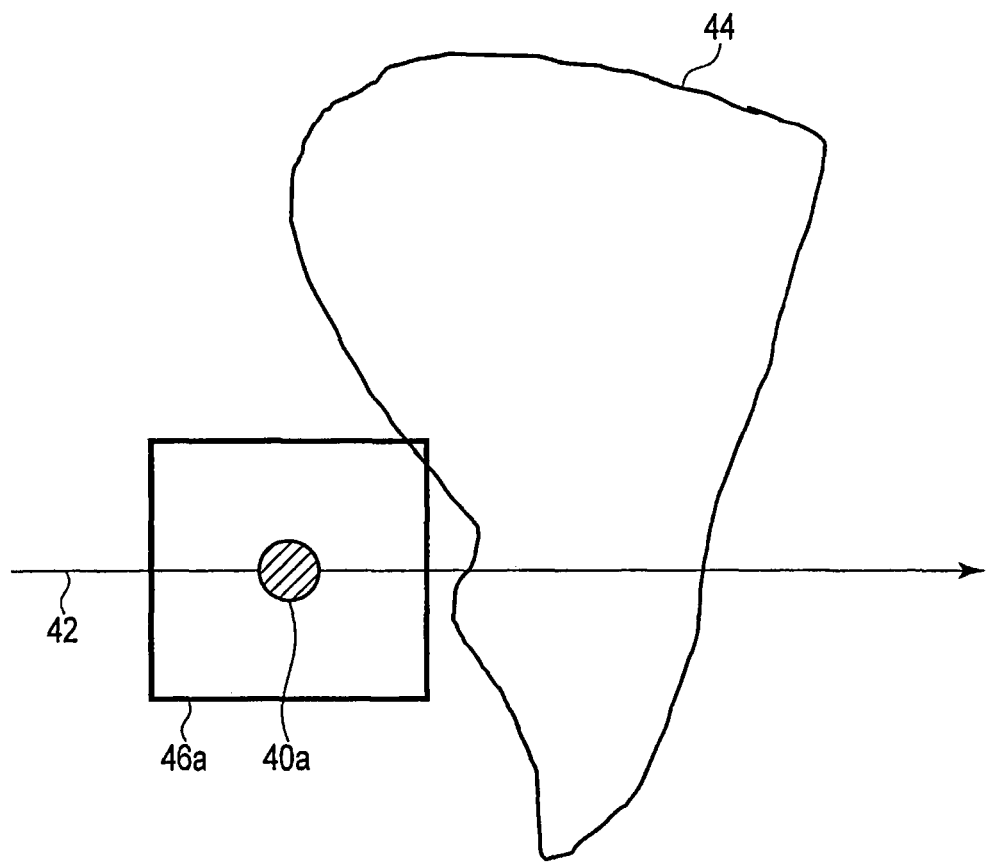
Figure 9D:
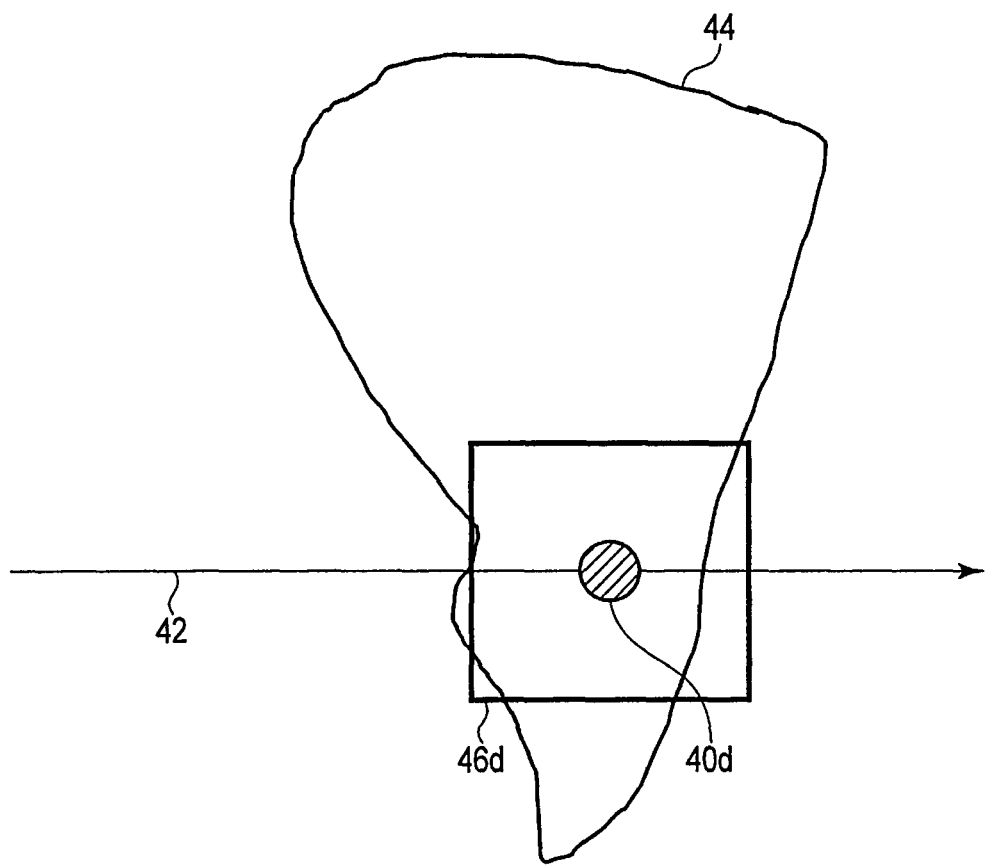
Figure 10:
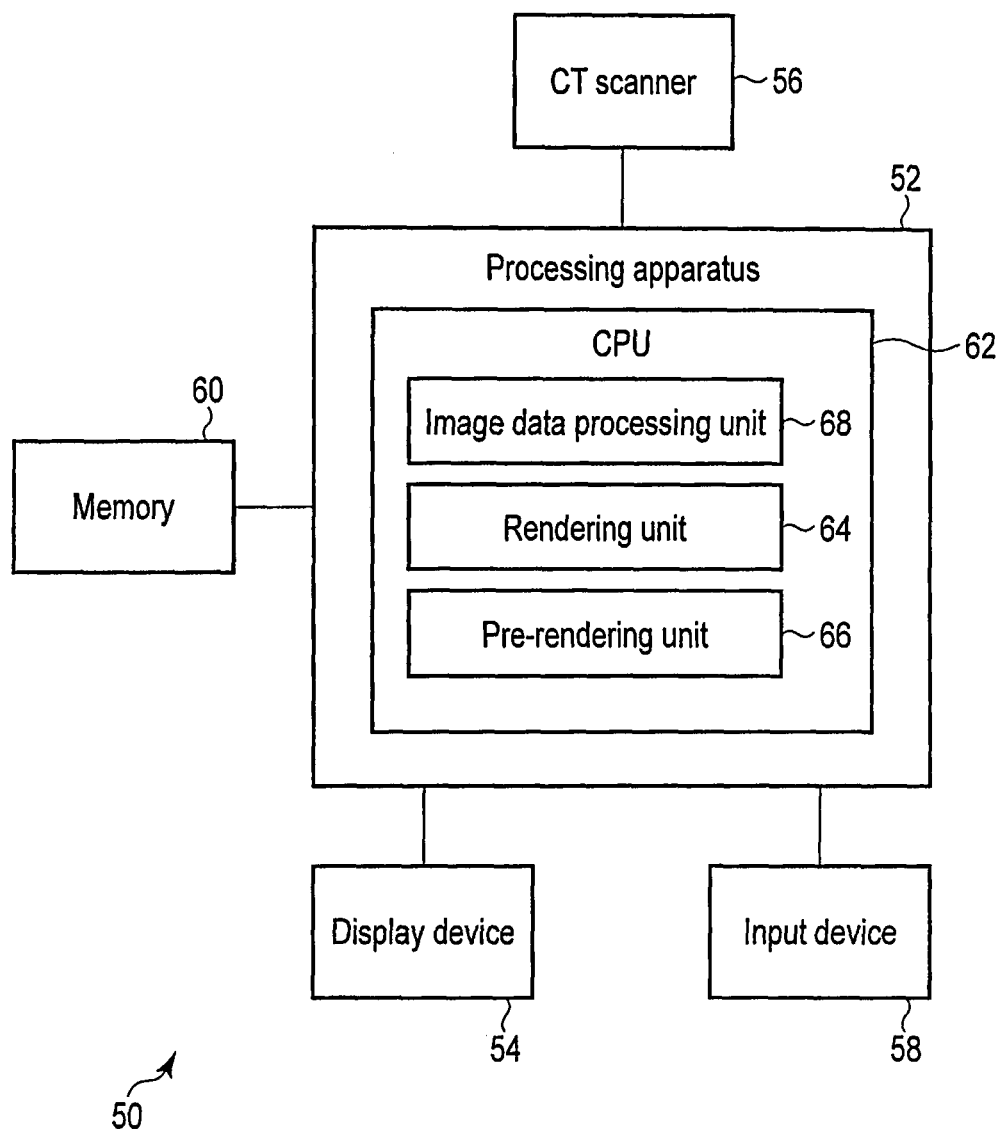
FIG. 10 is a schematic illustration of an image processing apparatus according to an embodiment.

An image processing apparatus according to an embodiment is illustrated schematically in FIG. 10 and is configured to implement the method described in the preceding paragraph. The apparatus comprises a processing apparatus 52, in this case a personal computer (PC) or workstation that is connected to a display device 54, a CT scanner 56 and a user input device or devices 58, in this case a computer keyboard and mouse.

Any suitable type of CT scanner may be used that is able to perform three dimensional CT measurements on a patient or other subject, for example one of the Aquilion® series of scanners produced by Toshiba Medical Systems Corporation. Although the embodiment of FIG. 10 is described in relation to CT scan data, any other suitable type of scanner producing any suitable type of image data may be used in alternative embodiments, for example MR, PET, ultrasound or X-ray image data of suitable form and if subject to suitable pre-processing.

The processing apparatus 52 provides a processing resource for automatically or semi-automatically processing image data, and comprises a central processing unit (CPU) 62 that is operable to load and execute a variety of units or other components that are configured to perform methods as described in detail below.

The units include an image data processing unit 68 for performing any of a variety of image data processes, for example registration procedures, segmentation procedures, measurements or diagnostic procedures if so desired. The units also include a rendering unit 64 for rendering display images based on received volumetric image data, and a pre-rendering unit 66 for performing associated processes prior to the rendering by the rendering unit 64.

The processing apparatus 52 also includes a hard drive and other components including RAM, ROM, a data bus, an operating system including various device drivers, and hardware devices including a graphics card. Such components are not shown in FIG. 10 for clarity. Any suitable CPU and other components of the processing apparatus may be used in different embodiments.

In the embodiment of FIG. 10, image data sets are received by the processing apparatus 52 from the CT scanner 56 following performance of scans by the scanner 56, and are stored in the memory 60 and processed by the processing apparatus. Although the scanner 56 shown in the embodiment of FIG. 10 is a CT scanner, any other suitable type of scanner can be used to obtain the image data sets in alternative embodiments, for example one or more of a PET, MRI, ultrasound, or X-ray scanner.

In a variant of the embodiment of FIG. 10, the processing apparatus 52 receives image datasets from a remote data store (not shown) rather than from the scanner 56. The remote data store stores a large number of different data sets obtained from many different scanners over a period of time together with associated patient data. The data store may be a server that stores a large quantity of patient data, and may form part of a Picture Archiving and Communication System (PACS), for example the Toshiba Rapideye® system.

The system of FIG. 10 is configured to receive volumetric image data sets from the memory 60, the scanner 56 or a remote data source and to render a two-dimensional projection of the three dimensional volumetric data. The two-dimensional projection may include desired texture or shading effects, and may provide an impression of a surface in three dimensions to the viewer.

The rendering unit 64 is configured to perform any suitable rendering technique for example direct volume rendering based on ray casting or ray tracing techniques, and uses transfer functions to map intensity or other values of voxels of the volumetric image data to opacity values and colour values. The rendering unit subsequently processes the resulting opacity and colour values for sampled voxels along the ray path to determine a pixel value for a pixel of the rendered image, and repeats that process for a plurality of ray paths to build up pixel values for each of the pixels of the rendered image.

It is a feature of the embodiment of FIG. 10 that the sampling of voxel values to determine opacity and colour values at the sample positions is based on the use of a look-up table that maps image data values (e.g. voxel values, for example intensity values) to colour and opacity values, for example red, green, blue and alpha values. In alternative embodiments, the look-up table maps image data values to opacity and grayscale values rather than colour values.

In the embodiment of FIG. 10, the look-up table is stored in the memory 60 and the 1D look-up table is generated using a process such as that described in H. Kye et al, Interactive Classification for Pre-Integrated Volume Rendering of High-Precision Volume Data, Graphical Models, 70 (2008), 125-132.

The look-up table is generated from a transfer function used for the rendering, and may be regenerated each time the transfer function changes. The transfer function may be modified or selected by a user via the user input device 58. For example, the user may operate one or more sliders, buttons or other controls to modify image parameters (such as colour schemes, or intensity ranges of interest) of the rendering that in turn are represented in the transfer function. Alternatively or additionally the transfer function, and thus associated look-up table, may be selected from a plurality of stored transfer functions (and associated look-up tables).

Figure 11:
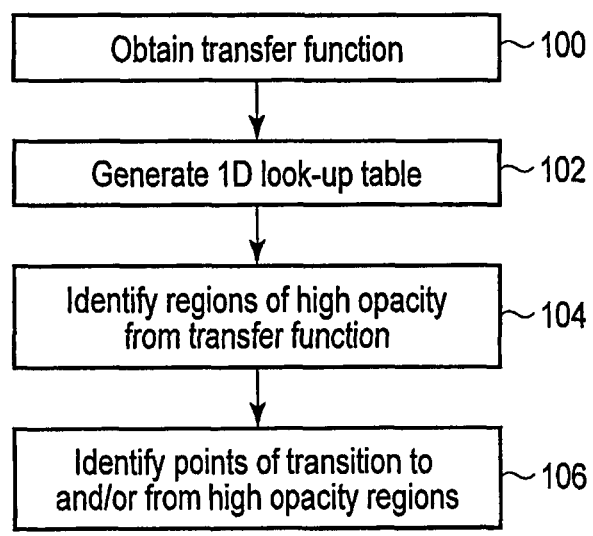
FIG. 11 is a flow chart illustrating in overview a process for identifying points of transition to or from high opacity regions.

FIG. 11 is a flowchart that illustrates in overview a pre-rendering process performed by the pre-rendering unit 66 to generate a 1D lookup table and to identify associated high opacity region transition points.

At the first stage 100, the pre-rendering unit 66 obtains the transfer function that pertains to the currently requested render. The transfer function may be obtained from the memory 60 or may have been generated by the image data processing unit 68, for example in response to user input requesting desired characteristics of the render.

At the next stage 102, the pre-rendering unit 66 generates a 1D lookup table that stores values of colour and opacity as a function of voxel intensity. In this embodiment, the 1D look-up table is generated using a process as described in H. Kye at al, Interactive Classification for Pre-Integrated Volume Rendering of High-Precision Volume Data, Graphical Models, 70 (2008), 125-132.

Next, at stage 104, the pre-rendering unit 66 analyses the transfer function to identify regions of high opacity. In this example, regions of high opacity are taken as being those regions that have an opacity value equal to 1.0. In other embodiments, regions of high opacity are those regions that have an opacity greater than or equal to some other opacity threshold.

The pre-rendering unit 66 next, at stage 106, identifies points (in this case, voxel intensity values) at which transitions to and/or from any regions of high opacity occur. Each of those points can be taken as representing a point of transition to or from a high opacity state. FIG. 12 shows the transfer function in the present example, as a plot of opacity versus voxel intensity (CT value in this case). The pre-rendering unit 66 in this case identifies all intensity values greater than the intensity value at the point indicated by the arrow 110 as representing a high opacity region, and identifies the intensity value at the point indicated by the arrow 110 as being a transition to the high opacity region. The pre-rendering unit stores transition point data in the memory 60 identifying the transition point 110, and associates the stored transition point data with the corresponding transfer function and 1D look-up table.

Effectively, the table may be searched and points recorded at which the transfer function becomes opaque or the transfer function stops being opaque. That allows a record to be kept of where these intervals are in the transfer function (those regions where the inaccuracy of the unmodified method will be most prominent) and deal with them specifically.

The 1D lookup table and the corresponding transfer function and stored transition point can be used to determine colours and opacities for a series of sample points along a path, and the determined colours and opacities can then be processed together by the rendering unit 64 to determine a pixel colour for a pixel corresponding to that path. That process is described in more detail with reference to the flow chart of FIG. 13, which includes a sampling process comprising stages 122, 124, 126, 128, 130, 132, 134.

At the first stage 120, the rendering unit 64 receives a set of volumetric image data that is to be subject of sampling and rendering processes. At the next stage 122, the rendering unit 64 samples voxel intensity values at each of a series of sample points along an imaginary ray path through the volume, the ray path corresponding to a pixel position on an imaginary image plane.

At the next stage 124, the rendering unit 64 determines for the first of the sample points whether there is a transition point in the sample interval that corresponds to the intensity value determined for that sample point. In the present embodiment, the sample interval for a particular determined intensity value comprises the transfer function for all intensity values up to and including the determined intensity value.

The rendering unit 124 determines whether there is a transition point in the sample interval from a comparison of the stored transition point data and the range of intensity values that make up the sample interval.

Figure 13:
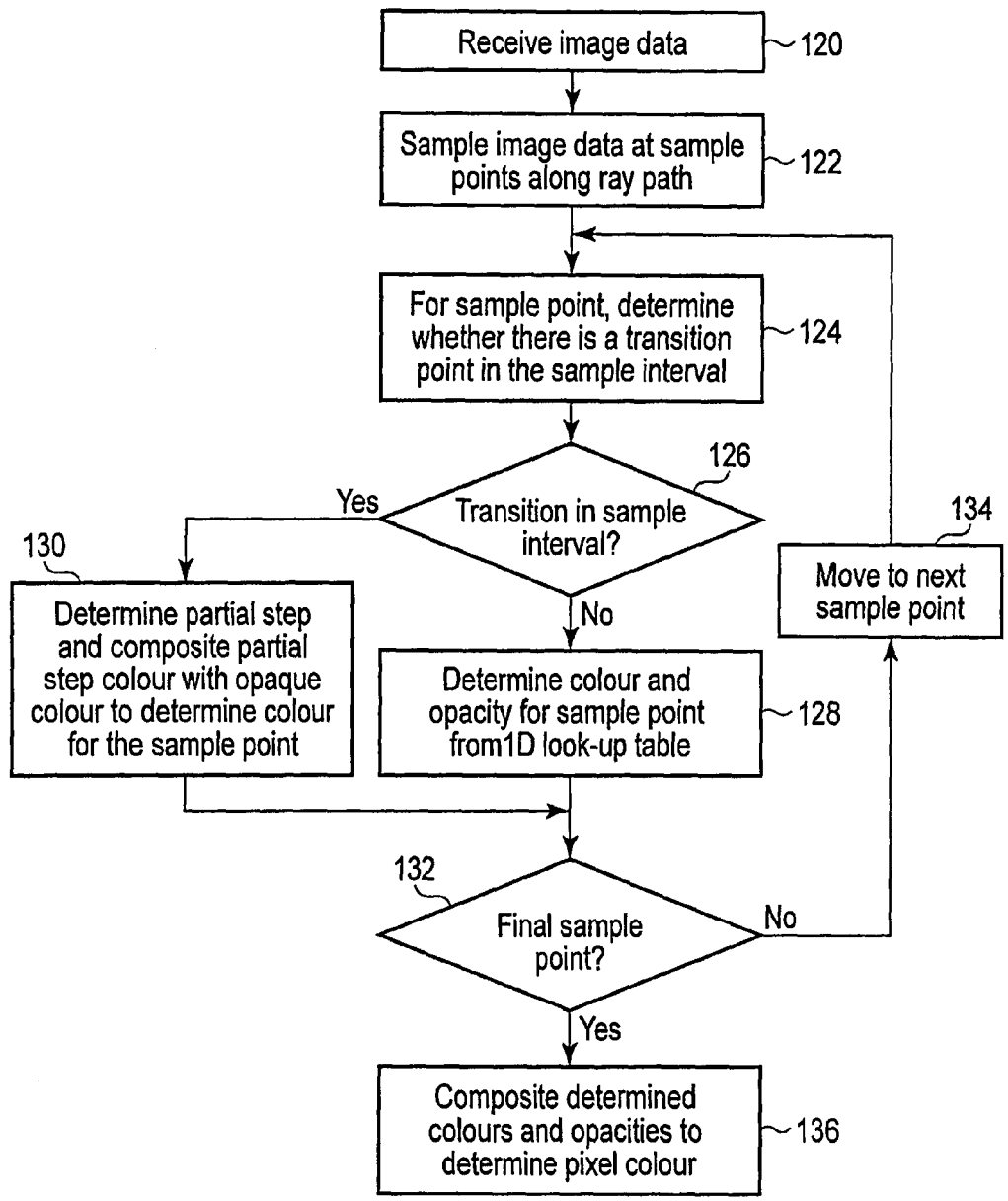
FIG. 13 is a flow chart illustrating in overview an image rendering process according to an embodiment.
Figure 14:
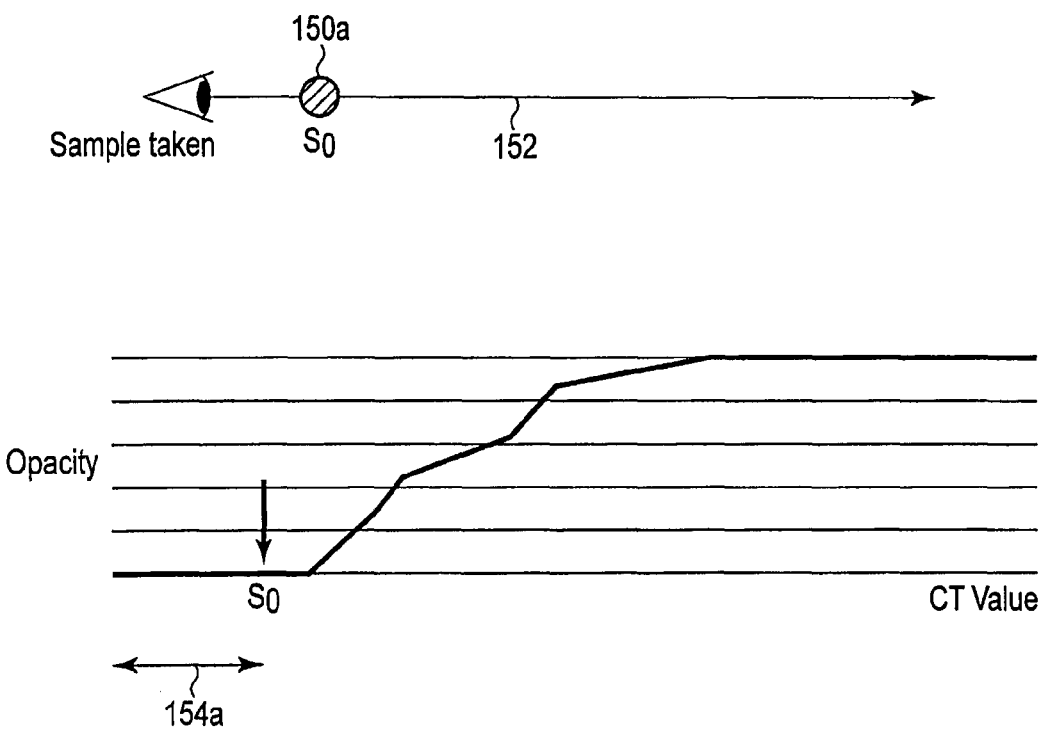
FIGS. 14, 15, 16a and 16b are schematic illustrations showing a succession of sample points along a ray path, and an associated transfer function.

In the example of FIG. 13, the position of the first sample point (s0) 150a along the ray path 152 is shown schematically in FIG. 14. FIG. 14 also shows a plot of opacity as a function of intensity (CT value in this case) for the transfer function in this example. It can be seen that the intensity pertaining at the sample point (s0) 150a corresponds to an opacity value of 0.0 according to the transfer function.

The sample interval for the sample point (s0) 152 in this case covers all intensity values between zero and the value pertaining at the sample point (s0) 150a. It can be seen that the opacity values for the sample interval for sample point (s0) 150a are all equal to 0.0, and thus there are no transition points to or from a high opacity region in the sample interval for the first sample point (s0) 150a. Thus, there is no transition to a high opacity state and the process passes to stage 128, and the colour and opacity values for the sample point (s0) 150a are determined from the 1D look-up table based on the intensity at the sample point (s0) 150a. In this case, the opacity determined from the 1D look-up table is zero, which is approximately equal to the average of opacity values over the sample interval 154a, as the opacity values corresponding to all intensity values in the sample interval 154a are zero.

It is then determined at stage 132 whether the sample point is the final sample point. In this case it is not, and so the process moves 134 to the next sample point (s1) 150b, and returns to stage 124 to determine whether there is a transition point in the sample interval for that next sample point (s1) 150b.

Figure 15:
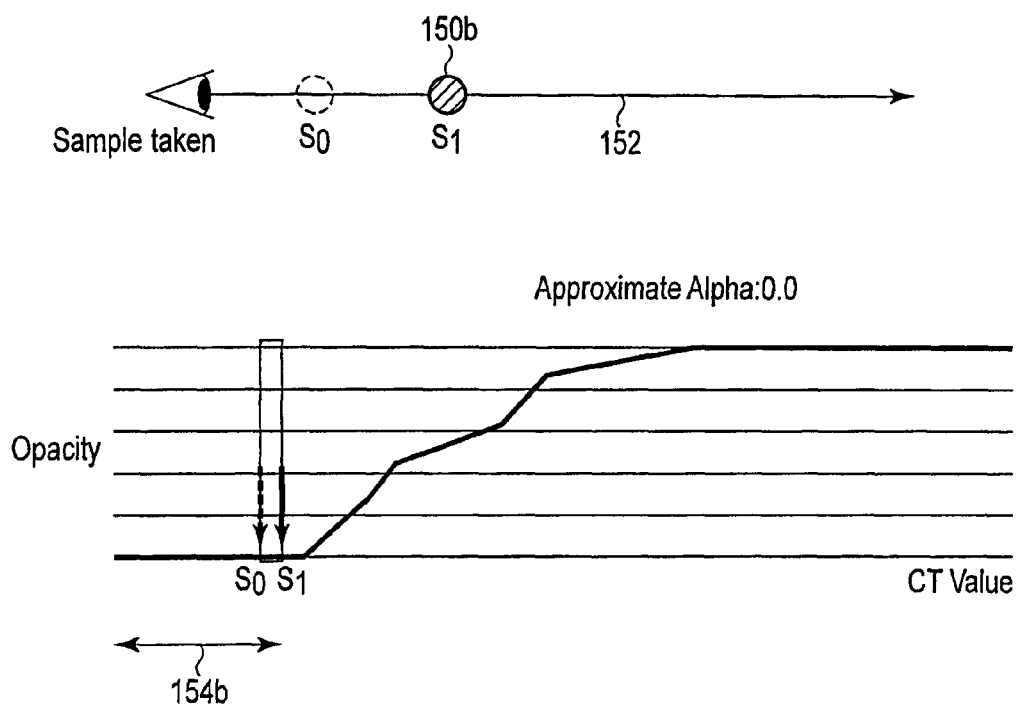

The position of the next sample point (s1) 150b along the ray path 152 in this example is shown schematically in FIG. 15, which again also shows a plot of opacity as a function of intensity for the transfer function. The intensity at the sample point (s1) 150b is slightly higher than that pertaining at the first sample point (s0) 150a. However, the intensity at the second sample point (s1) 150b again corresponds to an opacity value of 0.0 according to the transfer function, as can be seen from FIG. 15. Again, there are no transitions to or from a high opacity region in the sample interval 154b for sample point (s1) 150b. Therefore, the process moves 134 to the next sample point (s2) 150c, and returns to stage 124 to determine whether there is a transition point in the sample interval for that next sample point (s2) 150c.

Figure 16A:
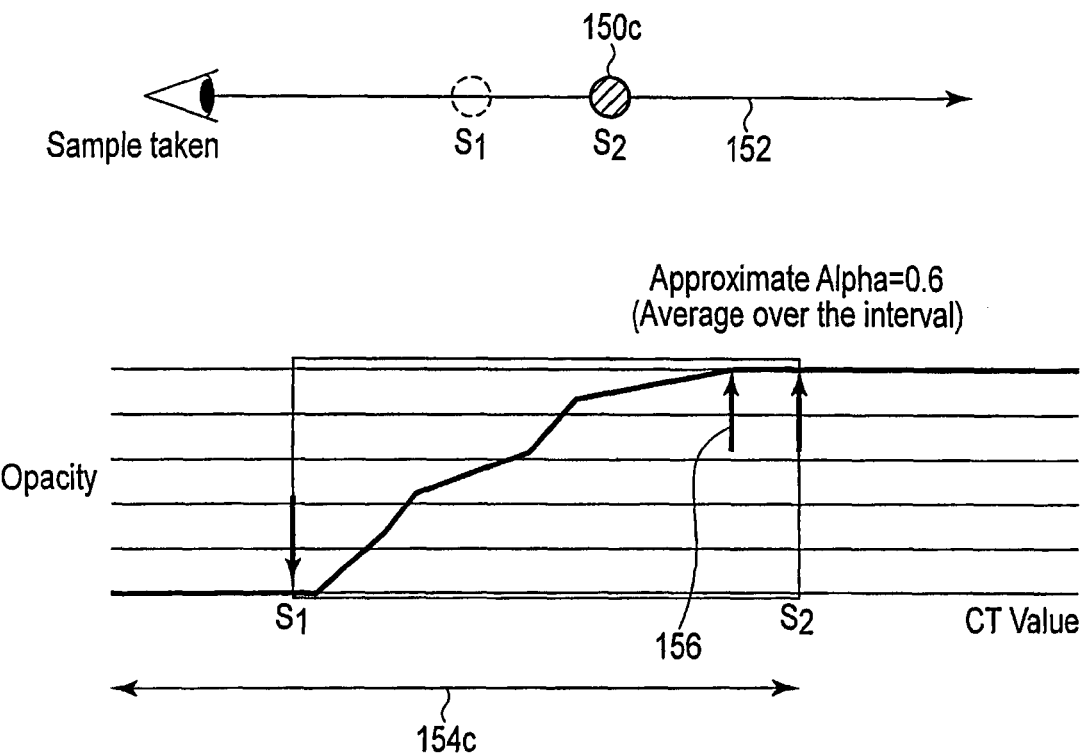
Figure 16B:
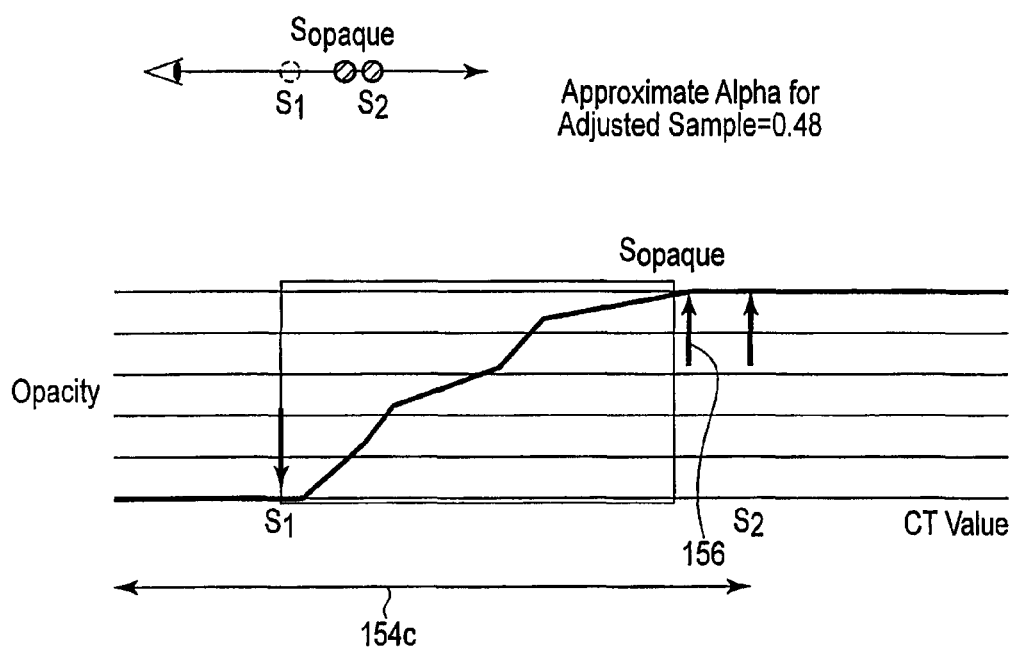

The position of the next sample point (s2) 150c along the ray path 152 is shown in FIG. 16a. The intensity at the sample point (s2) 150c is significantly higher than the intensity at the previous two sample points, (s0) 150a and (s1) 150b, and is also higher than a transition point 156, shown on the transfer function in FIG. 16a, at which point there is a transition to a high opacity region (opacity=1.0 in this case). Thus, there is a transition to a high opacity state.

If the opacity for sample point (s2) 150c were to be determined in the normal way from the 1D lookup table at stage 128, the approximate value of opacity that would be produced would be 0.6 in this case (representing an average of all opacity values of the transfer function over the sample interval 154c for the sample point (s2) 150c). However, in reality a beam would not progress beyond the point 156 where the opacity first reaches a value of 1.0, and so including opacity (and colour values) after the point may cause incorrect opacity (and colour) values. Therefore, a different approach is adopted and, as there is a transition 156 to a high opacity state the sampling process is modified and the process passes to stage 130 rather than stage 128.

At stage 130, a partial step is determined as ending at the transition point 156 ($S_{opaque}$). An assumption is made in this case that the intensity increases (or decreases) linearly from its value at the previous sample point (s1) 150b to the current sample point (s2) 150c. Thus the ray being traversed hits the start of the opaque interval $s_{opaque}$ at $(s2-1)/(s_{opaque}-s1)$. This is just the proportion of the last step until the opaque point is reached.

A transfer function lookup is then performed and the opacity for the point ($S_{opaque}$) 156 is determined (in substantially the same way as for the determination of values in the 1D lookup table) as being an average of the opacity values of the transfer function for intensity values up to the intensity value at the transition point 156. In the present case, the determined opacity value is 0.48 (compared to the value of 0.60 determined from the 1D look-up table for position (s2) 150c).

Similarly a transfer function lookup is performed and colour values (e.g. red, green and blue colour values) for the point ($S_{opaque}$) 156 are determined as being an average of the colour values of the transfer function for intensity values up to the intensity value at the transition point 156 (rather than up to the transition value at the point (s2) 150c).

Effectively, the previous sample is pre-integrated with the opaque transition point 156 (obtaining the colour just before reaching the opaque region), scaled according to the computed step-portion and composited with the transfer function value at the point it became opaque beneath that computed colour.

The position of the sample point can be considered to have been changed from being at (s2) 150c to being at the transition point ($S_{opaque}$) 156. The modification of the position of the sample point in this example causes a modification of opacity and colour values for the sample point, In an alternative embodiment, the opacity and colour values for the modified sample point ($S_{opaque}$) 156 are determined by interpolating values from the 1D look-up table for the immediately prior and subsequent (unmodified) sample points, (s1) 150b and (s2) 150c in this case.

At the next stage 132 it is determined whether the sample point is the final sample point. In the present example, the point (s2) 150c (replaced by the point ($S_{opaque}$) 156) is taken as the final sample point as the ray will not progress beyond the high opacity transition point 156. At the next stage the determined opacities and colours for the sample points, in this case (s0) 150a, (s1) 150b and ($S_{opaque}$) 156, are processed together using known rendering techniques to determine the colour of a pixel of the image to be rendered.

The process of FIG. 13 is then repeated for ray paths corresponding to each pixel of the image to be rendered.

The approach of FIG. 13, involving the checking for transitions to or from high opacity states can be implemented in some embodiments as a binary search for generated transition points to identify at what data values (storing an upper threshold and a lower threshold) the ray being traversed will cross into or out of an opaque interval of the transfer function. At each sample point the current sample is compared with the thresholds, and it is flagged when such a point is crossed (effectively, when the sampling moves into or out of an opaque object).

The example described in relation to FIG. 13 was described in relation to the transfer function of FIG. 12, which had a transition to high opacity with increasing intensity. In many renders, the transfer function may have a transition from rather than to a region of high opacity as intensity increases, depending on the anatomy or substances to be visualised. The process of FIG. 13 can equally search for transitions from (rather than to) regions of high opacity and modify the sampling process as described, when such transitions are detected.

The process outlined in FIG. 13 can achieve good results for the type of transfer functions regularly used in medical visualization—the majority of which use low-opacity sections, opaque sections and transitions between the two. The approach can involve doing local heuristics inside the renderer, which in other cases can represent a large performance cost but in this case can merely comprise an infrequent search of perhaps 0 to 5 points in some cases, and two boolean comparisons each step. The performance impact of implementing this has been found to be negligible for at least some data sets, with significant image accuracy gains.

A further transfer function is shown in FIG. 17 which represents variation in opacity 170, and red 172, green 174 and blue 176 values as a function of measured intensity. The transfer function in this case is used in a 3D rendering of the interior of a trachea.

A simple numerical sampling approach, for example as described with reference to FIG. 1, in this case leads to tree ring or contour artefacts as shown in FIG. 18a. The artefacts result from a thin layer on the surface of trachea going un-sampled in particular areas due to the discretization of the simple numerical approach. The 2D look-up table approach would also lead to errors, in the colour of the rendered image. In this case, thin pink isosurface is present at the inside surface of the trachea, however after that isosurface, there is white material (it can be seen that the green and blue channels rise after the opacity peak in the transfer function of FIG. 17). Due to the sampling of regions after the transition to high opacity that result from known 2D look-up table approaches, the rendered image will appear white rather than pink. In contrast, the process of FIG. 13 produces an image shown in FIG. 18b that captures the detail of the surface of the trachea more accurately, without the tree ring or contour artefacts, and with the desired colour representation (pink in this case).

The approach of FIG. 13 that uses pre-integration in combination with local transfer function information can, in some cases, achieve significant gains in image quality with negligible impact on memory footprint, very small performance cost, and little interference or intrusion into the rest of a renderer's structure.

It is a feature of certain embodiments that the rendering unit 64 and pre-rendering unit 66 are configured to modify sampling processes in order to provide gradient position correction in the presence of high opacity states, as well as or instead of to provide colour and opacity corrections. A process performed in such embodiments is illustrated in overview in the flow chart of FIG. 19, which includes a sampling process comprising stages 202, 204, 206, 208, 210, 212, 214, 216, 218.

At the first stage 200, the rendering unit 64 receives a set of volumetric image data that is to be subject of sampling and rendering processes. At the next stage 202, the rendering unit 64 samples voxel intensity values at each of a series of sample points along an imaginary ray path through the volume, the ray path corresponding to a pixel position on an imaginary image plane.

At the next stage 204, the rendering unit 64 determines opacity and colour values for the first of the sample points from the 1D look-up table. The rendering unit 64 may use a process such as that described in relation to FIG. 13 to determine the opacity and colour values, in which the opacity and colour values are modified if there is a transition to or from a high opacity region, thereby providing correction of possible colour errors. In alternative embodiments, the rendering unit 64 may read the opacity and colour values from the look-up table without modification if so desired.

At the next stage 206, the rendering unit determines the value of the cumulative opacity for the sample point and any preceding sample points. That may, for example, be a simple sum of the opacity for the current sample point and any preceding sample points.

It is then determined at stage 208 whether the cumulative opacity exceeds a pre-determined threshold. If the cumulative opacity exceeds the threshold then there is taken to be a transition to a high opacity state. The first sample point 230a in the present example is shown in FIG. 20, positioned along the path 232 of an imaginary ray cast through a volume represented by imaging data, for example a set of voxels of CT imaging data. The imaging data comprises a region 234 of high-intensity (and high opacity according to the transfer function in this case) with all other regions being of low intensity (and thus low opacity according to the transfer function in this case). It can be seen that in this case the first sample point 230a is in a region of low opacity and thus the cumulative opacity (which as this is the first point is equal to the opacity for point 230a alone) is below the cumulative opacity threshold.

As the cumulative opacity for point 230a is below the threshold, the process passes to stage 210, and a gradient region 236a is determined centred around the sample point 230a. In this case, the sample point 230a also functions as a gradient position at which the gradient of intensity data is determined. In this example, the gradient region 236a is a 4 voxel×4 voxel×4 voxel cube centred around the gradient position 236a, although any other suitable size or shape of gradient region may be used in other embodiments.

At the next stage 212, a gradient value is determined for the sample point by processing the voxel intensity values of the voxels of the gradient region 236a. The gradient value represents the rate of a change in three dimensions of voxel intensity values within the gradient region. If there is a clearly defined surface present within the gradient region, the gradient value will for example represent the steepness and orientation of the surface. In the case of sample point 230a, all voxels have the same low intensity value and so the gradient value will have a value of zero, representing a homogeneous region.

The rendering unit 64 then determines whether the sample point is the final sample point. In this case, sample point 230a is not the final sample point and so the process moves 216 to the next sample point and determines the cumulative opacity for the next sample point at stage 206.

Figure 21:
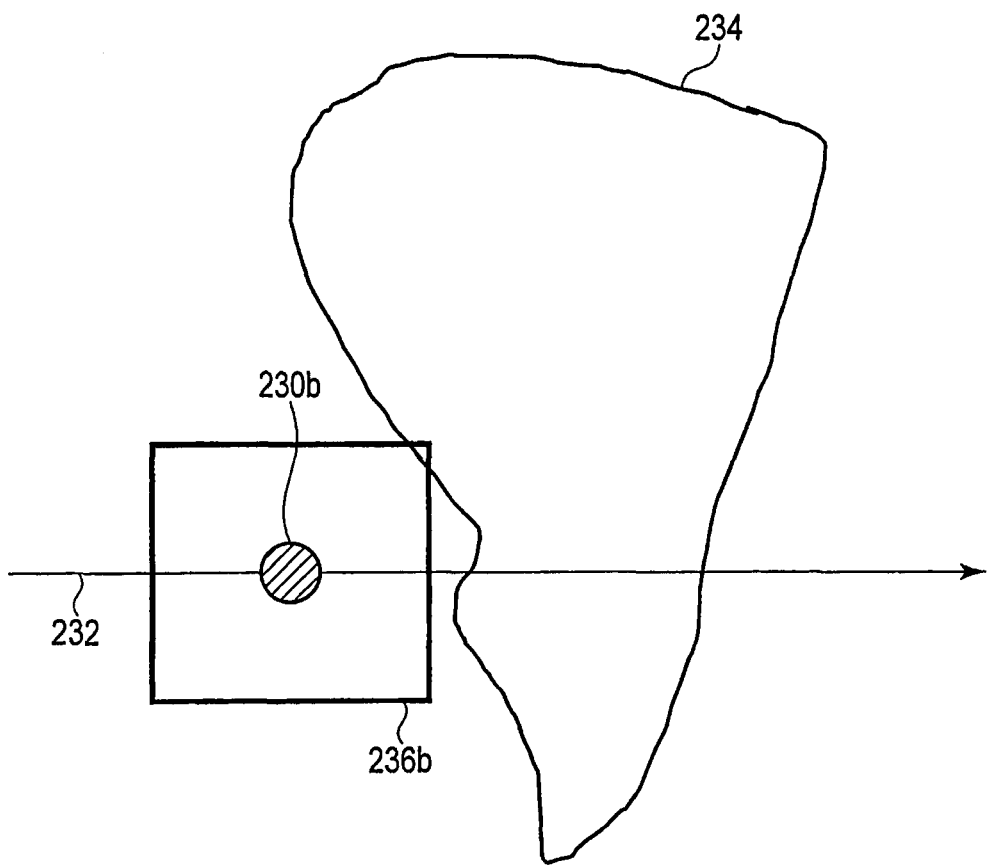

The next sample point 230b in this example is shown in FIG. 21. The opacity for the sample point 230b is again determined from the 1D look-up table and/or processes described in relation to FIG. 13. The cumulative opacity is then calculated, which in this case is the sum of opacities for the sample points 230a and 230b.

The opacity for the sample point 230b is again low, and the cumulative opacity is also low and below the cumulative opacity threshold. The process thus passes to stage 210, in which the rendering unit 64 determines a gradient region 236b centred around sample point and gradient position 230b. The gradient region 236a is the same size and shape as gradient region 236a. Gradient data is then calculated at stage 212 from intensity data for the voxels within the gradient region 236b. In this case, it can be seen from FIG. 21 that a corner of the gradient region 236b has entered the high intensity region 234. Thus the value of the gradient data for position 230b is calculated as being slightly different to the value of the gradient data for position 230a.

Figure 22:
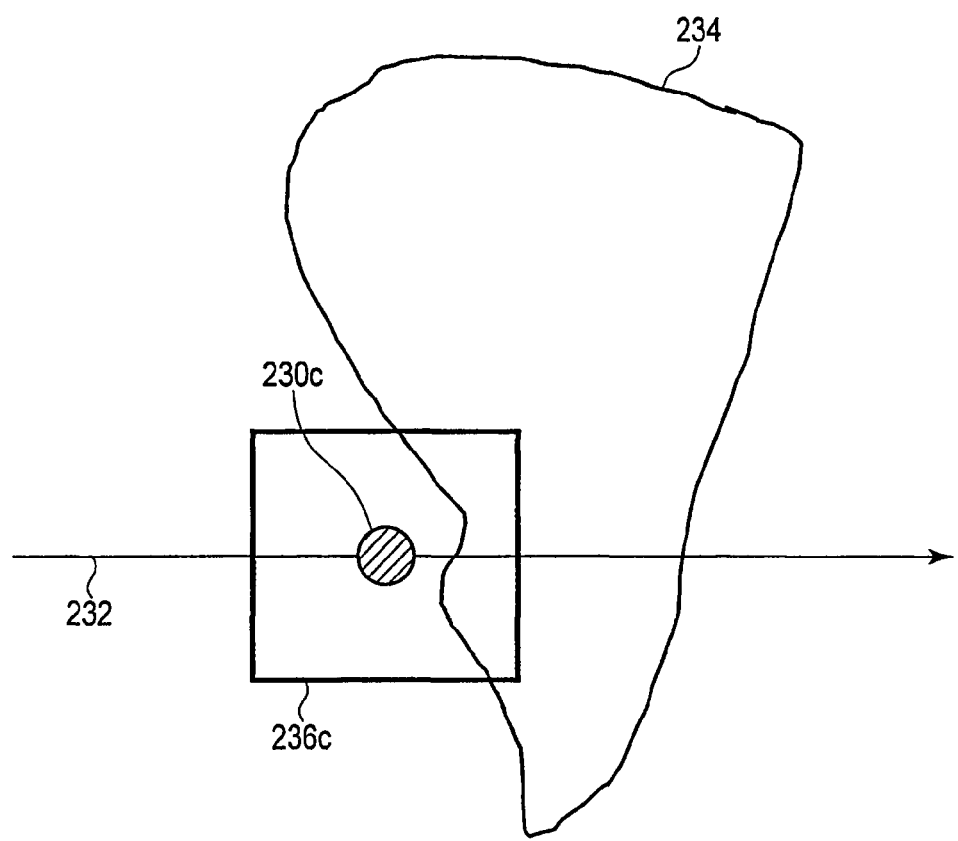

Sample point 230b is not the final sample point and so the rendering unit moves to the next sample point and determines at stage 206 the cumulative opacity in respect of the next sample point. The next sample point 230c is shown in FIG. 22. Again the opacity value for point 230c is low, and the cumulative opacity value is below the threshold, so the rendering unit passes through stages 210 and 212 to determine the gradient value for sample point 230c from a gradient region 236c centred around the sample point 230c. In this case, a larger portion of the high intensity region 234 is included in the gradient region 236c and so the gradient value for sample point 230c differs from those for sample points 230a and 230b.

Sample point 230c is not the final sample point and so the rendering unit moves to the next sample point and determines at stage 206 the cumulative opacity in respect of the next sample point. The next sample point 230d is shown in FIG. 23.

Figure 23:
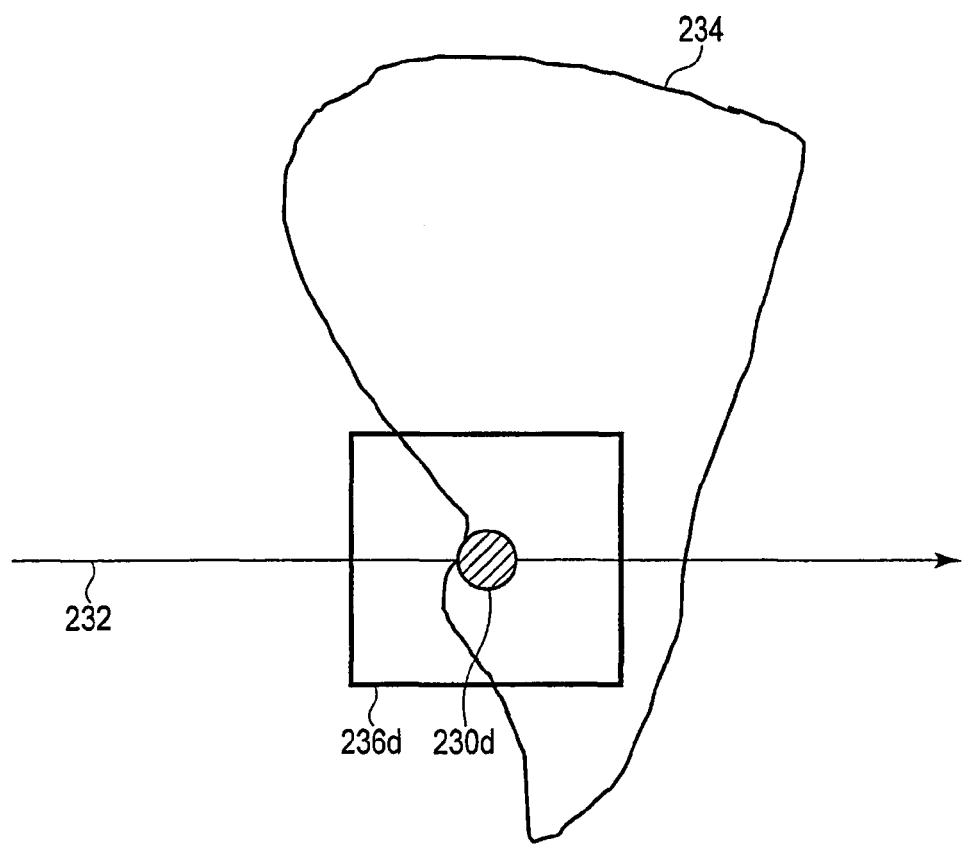

It can be seen from FIG. 23 that the sample point 230d has entered the high intensity region. The value of the opacity for the sample point 230d determined from the 1D look-up table is significantly higher for sample point 230d than for the preceding sample points 230a, 230b, 230c. However, the cumulative opacity (the sum of determined opacities for sample points 230a, 230b, 230c, 230d in this case) is still below the threshold. Therefore, the rendering unit passes through stages 210 and 212 to determine the gradient value for sample point 230d from a gradient region 236d centred around the sample point 230d. In this case, an even larger portion of the high intensity region 234 is included in the gradient region 236d and so the gradient value for sample point 230d differs from the gradient values for sample points 230a, 230b and 230c.

Sample point 230d is not the final sample point and so the rendering unit moves to the next sample point and determines at stage 206 the cumulative opacity in respect of the next sample point. The next sample point 230e is shown in FIG. 24.

Figure 24:
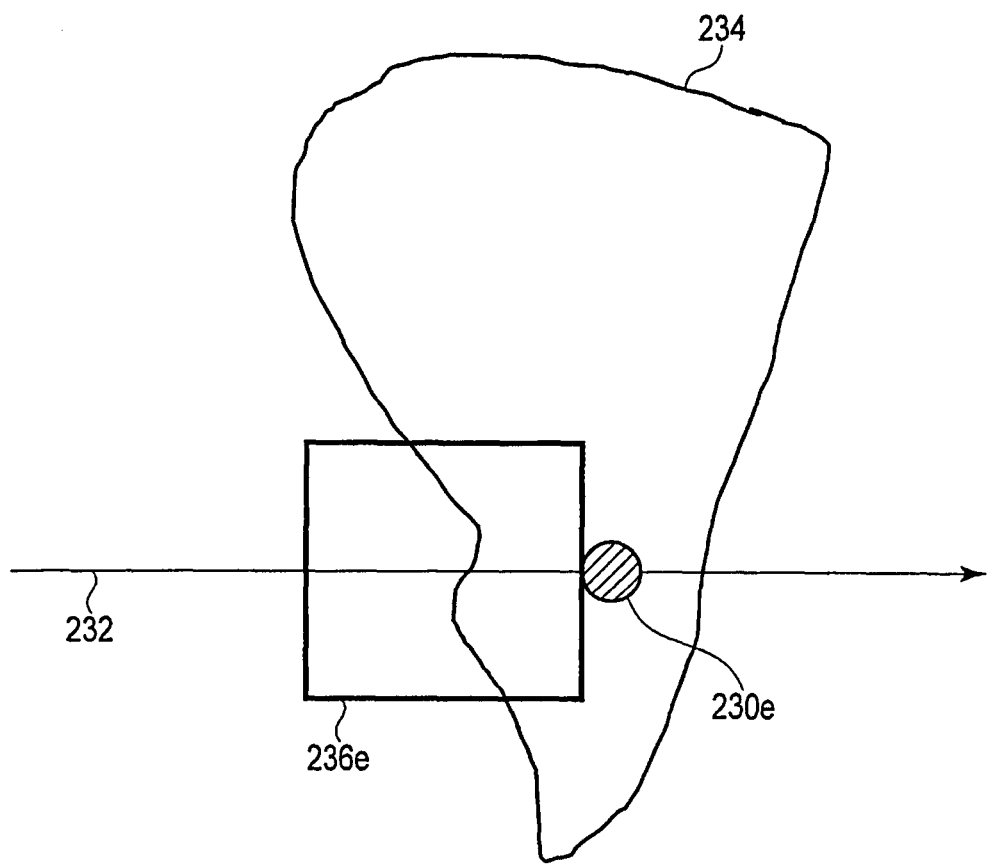

It can be seen from FIG. 24 that the sample point 230e is again within the high intensity region. The value of the opacity for the sample point 230e is again high, and in this case the cumulative opacity (the sum of determined opacities for sample points 230a, 230b, 230c, 230d, 230e) now exceeds the threshold. Thus a high opacity state has been entered.

As the cumulative opacity exceeds the threshold, the sampling process is modified and the rendering unit proceeds to stage 218 rather than to stage 210. At stage 218, the rendering unit causes the gradient region 236e to lag behind the sample position 230e.

In this case, the rendering unit 64 calculates the lag of the gradient region behind the sample position using the expression, gradient position=sample_position−ray_increment*(0.5+already accumulated opacity value ($\alpha$)). In this case, ray_increment represents the distance between successive sample points and the opacity value ($\alpha$) is in the range 0.0 to 1.0 (with 0.0 representing complete transparency and 1.0 representing complete opacity).

In the example of FIG. 24 it can be seen that the rendering unit 64 has caused the gradient volume 236e (centred around the gradient position) to lag the sample point 230 such the sample point 230e is outside the edge of the sample volume 236e.

Gradient data is then calculated at stage 212 from intensity data for the voxels within the gradient region 236e. The gradient data is associated with the sample point 230e even though the sample point 230e is outside the gradient region 236e. Thus, the colour contribution of sample point 230e to the rendering will be affected by a shading attributed to that colour contribution even though the sampling point is outside the gradient region used to determine gradient data that in turn determines a shading contribution.

It has been found in practice that whilst the gradient is extremely sensitive to discontinuities in the evaluation position (i.e. the position of the gradient region) it is not so sensitive to the evaluation position itself. In general, the more continuous the rendering algorithm and parameters are the better the resulting render may be, and the lag process illustrated in FIG. 24 can allow any iso-surfaces defined by the volume data (such as the surface of region 234 in FIG. 14) to affect gradually the gradient position, which can result in a smoother render with reduced image artefacts.

At the next stage 214 it is determined whether the sample point 230e is the final sample point. In this case, sample point 230e is not the final sample point and the rendering unit 64 moves to the next sample point 230f, shown in FIG. 25, and determines colour and opacity values. The cumulative opacity for sample point 230f is of course greater than the threshold and so the rendering unit 64 passes to stage 218 to determine the position of the gradient region 235f. The gradient region 236f continues to lag behind the sample point 230f and in this case, as can be seen in FIG. 25, the gradient region 236f has moved forward slightly but is still present around part of the front of the iso-surface of the high intensity and high opacity region 234 despite the continued progression of the sample points along the ray path 232.

In the case of sample positions 230e and 230f the lag of the gradient regions 236e, 236f means that the gradient regions 236e, 235f do not extend to include the far surface of the region 234 where the intensity (and opacity, according to the present transfer function) falls again. The non-inclusion of the far surface can, in this case, help to avoid shading artefacts.

Gradient data is then calculated at stage 212 for the gradient region 236f and associated with the colour and opacity values determined for the sample position 230f.

Sample position 230f is the final sample position to be considered and so the rendering unit 64 passes from stage 214 to stage 220 and composites the determined colours, opacities and gradients determined for sample positions 230a, 230b, 230c, 230d, 230e, 230f to determine a pixel colour and shading for one of the pixels of the rendered image. The processes of FIG. 19 are repeated for a series of other ray paths through the volume represented by the image data, thereby to determine colour and shading values for each of the pixels of the rendered image.

Figure 19:
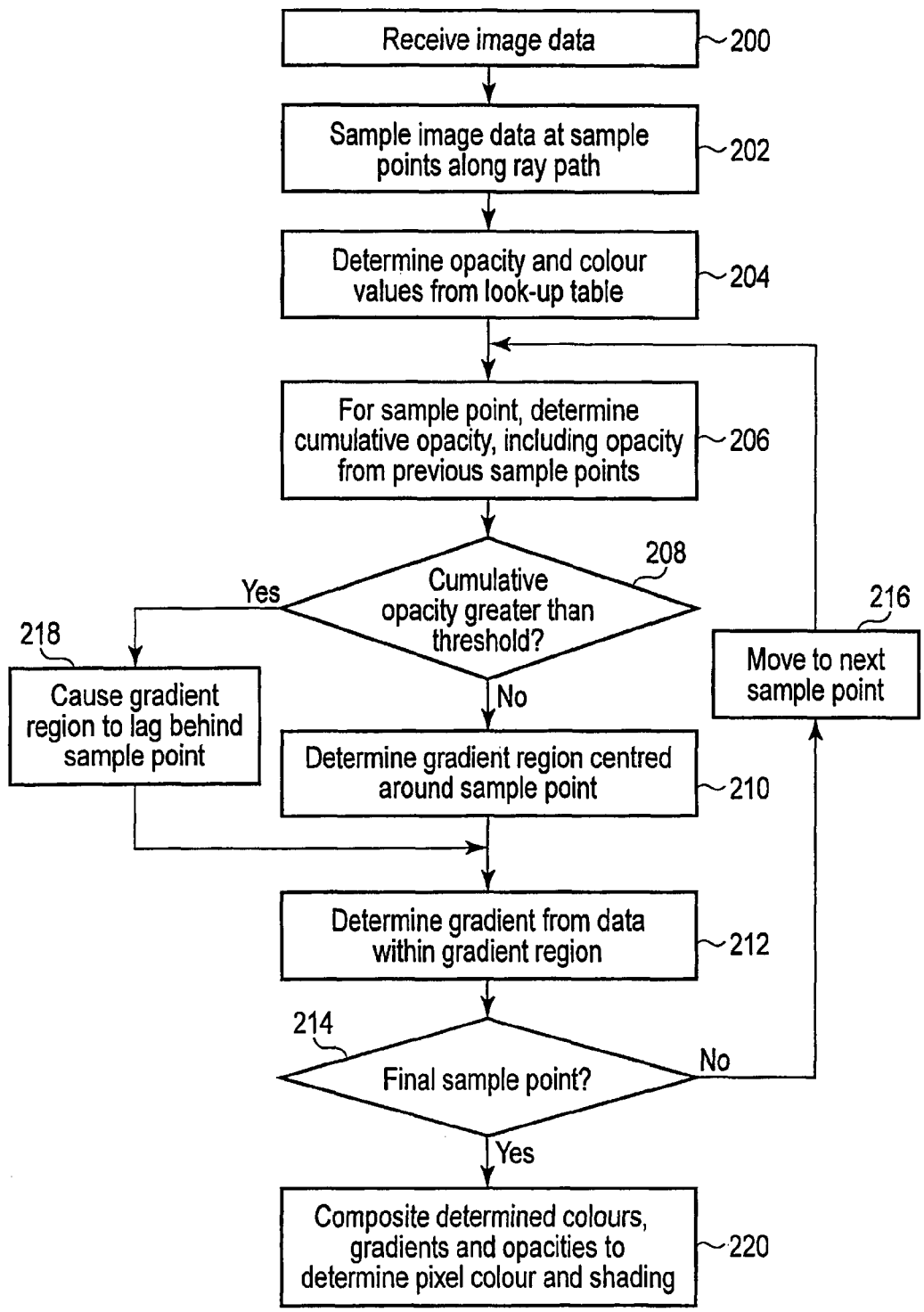
FIG. 19 is a flow chart illustrating in overview an image rendering process according to an embodiment.

The gradient region lag process of FIG. 19 can in some cases eliminate severe image artefacts that can be produced by known 1D pre-integration methods. The gradient region lag process can also produce little or no performance degradation, can be useful for both CPU and GPU rendering and can improve the appearance, in particular, in rendered images of thin surfaces and small particles.

Figure 26B:
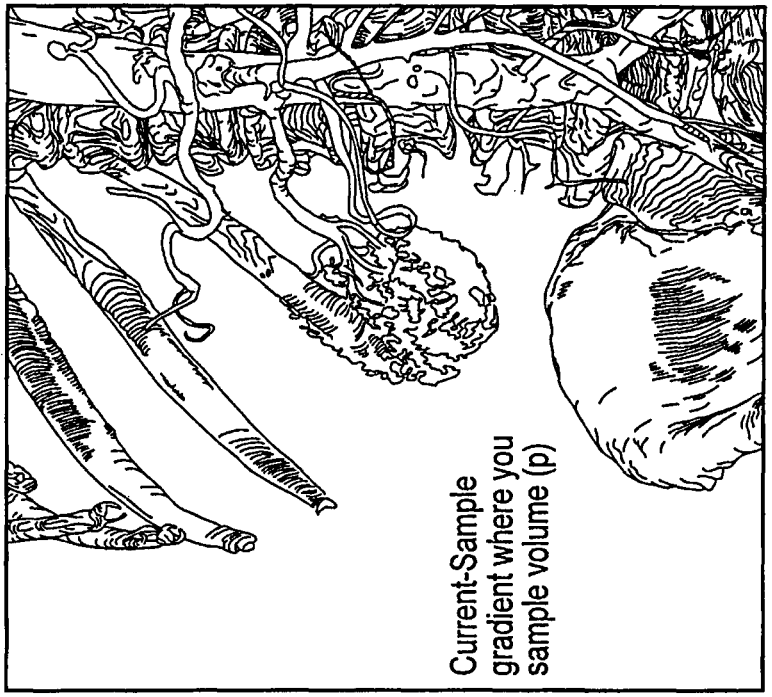
FIGS. 26a and 26b are rendered images obtained using a known rendering method and obtained used a process described in relation to FIG. 19.
Figure 26A:
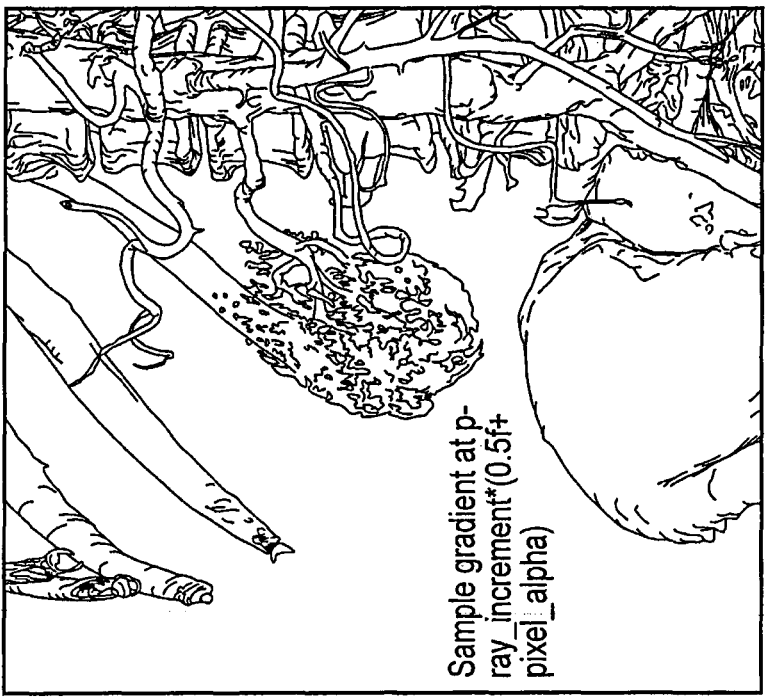

FIG. 26a shows a rendered image of bones and vasculature in a torso region of a subject, rendered according to the process of FIG. 19. FIG. 26b shows a rendered image of the same region rendered according to a known 1D pre-integration method without gradient region lag, and which includes various contour-type image artefacts particularly at the bone regions.

The gradient lag process described in relation to FIG. 19 provides for the gradient region to lag behind sample position according to an expression that can provide for gradual lag of the gradient region behind the sample position, depending on how quickly or abruptly, the accumulated opacity increases. In alternative embodiments, any suitable expression for determining the lag of the gradient region may be used. For example, in some cases the gradient region may automatically become stationary once the accumulated opacity has exceeded the threshold and may thus stay in the same position as the sample position steps further through the volume.

The embodiment of FIG. 10 is able to perform the processes of both FIGS. 13 and 19 during the rendering. The processes of FIG. 13 and FIG. 19 both involve the modification of a sampling process if there is a transition to or from a high opacity state. In the case of the process of FIG. 13, the transition to or from a high opacity state may comprise a transition to or from a high opacity region within a transfer function sample interval, whereas in the case of the process of FIG. 19, the transition to a high opacity state may comprise the matching or exceeding of a threshold by an accumulated opacity value. In alternative embodiments or alternative modes of operation, one or other of the processes of FIGS. 13 and 19 can be performed without the other. Thus, a colour correction in the presence of transitions to or from high opacity regions can be obtained without necessarily performing a gradient region lag process. Similarly a gradient region lag process can be performed without necessarily performing a process for colour and/or opacity correction in the presence of transitions to or from high opacity regions.

The processes of FIGS. 13 and 19 have been described in relation to the determining of colour values for pixels, but they and other embodiments can equally be used to determine gray-scale rather than colour values for pixels.

Although the processes of FIGS. 13 and 19 have been described in relation to the processing of CT data, any other suitable volumetric image data may be used, for example PET, MRI, ultrasound, or X-ray imaging. Image data may be any data that can be processed to produce an image for display.

A look-up table according to embodiments may comprise any data structure that associates values of a parameter with values of at least one other parameter. A look-up table may comprise any suitable data structure, for example but not limited to a set of database entries and/or a set of objects or instances of objects. A look-up table may be stored in a single physical data storage device or may be distributed across a plurality of physical data storage devices at the same or different locations.

For some embodiments, for each image data value the sample interval of the transfer function may comprise a range of image data values up to that image data value. The determining of whether there is a transition to or from a high opacity region may comprise determining for each of the sample points whether there is a transition to or from a high opacity region. A high opacity region may, for example, comprise a region for which the opacity is greater than or equal to an opacity threshold.

Certain embodiments also provide a method and apparatus for reducing colour inaccuracies in volume renderers comprising the creation of a sparse record of the opaque intervals of a transfer function, searching and storing ray-local thresholds (upon which the ray will be entering opaque material) to compare the sample against, correcting a colour computed from pre-integration with knowledge it contains an opaque point, and estimating accumulated colour over a partially-traversed interval with a colour computed from the pre-integration.

Certain embodiment also provide a method for shaded volume rendering using 1D pre-integrated transfer function (s) in which the gradient is evaluated at an offset from the ray position where the offset is a function of the accumulated opacity (e.g. alpha). The gradient may be evaluated at an offset from the ray position where the offset is a function of the distance to an adjacent iso-surface. The gradient may be evaluated at an offset from the ray position where the offset is accumulated separately from the opacity (e.g. alpha) using the transfer function or a pre-determined formula.

Embodiments may provide modifying of a sampling process for a pre-integration process based on an assessment of the opacity of an associated ray interval.

It will be well understood by persons of ordinary skill in the art that whilst some embodiments may implement certain functionality by means of a computer program having computer-readable instructions that are executable to perform the method of the embodiments, the computer program functionality could be implemented in hardware (for example by means of a CPU or by one or more ASICs (application specific integrated circuits)), FPGAs (field programmable gate arrays) or GPUs (graphic processing units) or by a mix of hardware and software.

Whilst particular units have been described herein, in alternative embodiments, functionality of one or more of those units can be provided by a single unit, processing resource or other component or functionality provided by a single unit can be provided by two or more units or other components in combination. Reference to a single unit encompasses a single component or multiple components, for example units, providing the functionality of that unit, whether or not such components are remote from one another, and reference to multiple units encompasses a single component, for example unit, providing the functionality of those units, or multiple components providing the functionality of those units.

While certain embodiments have been described, these embodiments have been presented by way of example only, and are not intended to limit the scope of the inventions. Indeed the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms and modifications as would fall within the scope of the invention.

The invention claimed is:

1. An image rendering apparatus for rendering an image from a set of image data representing a volume, the apparatus comprising a memory and processing circuitry,
the memory configured to store a one-dimensional look-up table that includes predetermined values of colour and opacity,
the processing circuit configured to perform a sampling process that comprises:
determining values of opacity for a plurality of sample positions along a specified path through the volume based on values of the image data at the sample positions, wherein the sample positions are separated by sample intervals;
determining values of colour/grayscale for the plurality of sample positions along the specified path, based on values of the image data at the sample positions;
determining whether there is a transition to or from an opacity state at a transition point within a sample interval between the sample points, wherein the opacity state is higher than a predetermined value and wherein the determining of whether there is the transition to or from the opacity state comprises determining, for each of the sample positions, whether the sample interval includes an image data value which corresponds to the transition to said opacity state according to a transfer function to emphasize a characteristic of the rendered image, and if there is the transition to or from the opacity state modifying at least part of the sampling process for at least one of the sample positions such that at least one of the values of colour/grayscale or opacity is determined based on a value determined from the one-dimensional look-up table of the image data at the transition point rather than on a value of the image data at said at least one of the sample positions,
wherein the determined values of opacity and colour/grayscale are processed to determine a pixel value for a pixel of the image,
the determining of whether there is the transition to or from the opacity state comprises determining, for each of the sample positions, whether there is a transition to or from a complete opacity state within the sample interval of the transfer function pertaining at that sample position, and
the memory is further configured to store at least one transition point marker that represents a value of image data value at which the opacity value according to the transfer function exceeds or falls below a threshold,
the determining of whether there is the transition to or from the complete opacity state comprises determining, for each sample position, whether there is a transition point marker within the sample interval for the image data value pertaining at that sample position, and
points of transition are identified in the one-dimensional look-up table, and presence of the transition point is determined from a comparison of stored transition point data and a range of intensity values that make up the sample interval.

2. An apparatus according to claim 1, wherein the modifying of the sampling process comprises modifying the sampling process for a pre-integration process based on an assessment of the opacity of an associated ray interval.

3. An apparatus according to claim 1, wherein at least one of:
the determining of values of opacity comprises determining the values of opacity from the one-dimensional look-up table;
the determining of values of colour/grayscale comprises determining the values of colour/grayscale from the one-dimensional look-up table.

4. An apparatus according to claim 3, wherein the one-dimensional look-up table comprises results of a pre-integration process.

5. An apparatus according to claim 3, wherein each of the stored values of colour/grayscale and opacity is computed from values of colour/grayscale and opacity for a respective sample interval of the transfer function.

6. An apparatus according to claim 1, wherein the modifying of at least part of the sampling process comprises, for at least one of the sample positions, modifying the value of opacity and colour/grayscale obtained for that sample position.

7. An apparatus according to claim 1, wherein the modifying of at least part of the sampling process comprises modifying the position of, or image data value for, at least one of the sample positions, and determining the value of opacity and colour/grayscale for that sample position in respect of the modified position or image data value.

8. An apparatus according to claim 7, wherein the modifying of the position or image data value comprises modifying the position or image data value to be substantially equal to a position or image data value pertaining at the transition to or from the complete opacity state.

9. An apparatus according to claim 1, wherein determining whether there is the transition to or from the complete opacity state comprises determining for at least one of the sample positions, whether an accumulated opacity value is greater than or equal to an opacity threshold.

10. Image rendering apparatus for rendering an image from a set of image data representing a volume, the apparatus comprising processing circuitry configured to perform a sampling process that comprises:
   determining values of opacity for a plurality of sample positions along a specified path through the volume;
   determining gradient values for a plurality of gradient positions along the specified path; and
   modifying at least part of the sampling process based on the determined values of opacity by, for at least one of the sample positions, making the gradient position lag behind that sample position,
   wherein the processing circuitry is further configured to process the determined values of opacity and gradient to determine a pixel value for a pixel of the image.

11. An apparatus according to claim 10, wherein the processing circuitry is configured to make the gradient position lag behind the sample position in response to determining that there is a transition to or from a high opacity state.

12. An apparatus according to claim 10, wherein determining each gradient value comprises determining the gradient value from image data values for a region around a corresponding one of the gradient positions.

13. An apparatus according to claim 10, wherein for each of the gradient positions, the processing circuitry is configured to associate the gradient value for that gradient position with opacity and colour/grayscale data for a respective one of the sample positions.

14. An apparatus according to claim 10, wherein, for at least one of the sampling positions, if it is determined that there is not a transition to or from a high opacity state for that sampling position, then the sampling position is substantially identical to an associated one of the gradient positions.

15. An apparatus according to claim 1, wherein each pixel value comprises at least one of colour, grayscale value, brightness.

16. An apparatus according to claim 1, wherein the image data comprises at least one of CT, MRI, PET, ultrasound, X-ray data.

17. An apparatus according to claim 1, wherein the determining of whether there is the transition to or from the complete opacity state comprises determining for each of the sample positions whether there is the transition to or from the complete opacity state, and if there is the transition to or from the complete opacity state for one of the sample positions then at least one of:
   making that sample position the final sample position;
   terminating the specified path.

18. An apparatus according to claim 1, wherein the processing of the determined values of opacity and colour/grayscale to determine a pixel value for a pixel of the image comprises compositing values of opacity and colour/grayscale obtained for the sample positions.

19. An apparatus according to claim 1, further comprising a display for displaying the rendered image.

20. An apparatus according to claim 1, wherein the processing circuitry is configured to perform the sampling process for each of a plurality of specified paths through the volume, and for each specified path to process determined values of opacity and colour/grayscale to determine a pixel value for a respective pixel, thereby to obtain pixel values for a plurality of pixels of the rendered image.

21. A method of rendering an image from a set of image data representing a volume, the method comprising:
   storing, in a memory, a one-dimensional look-up table that includes predetermined values of colour and opacity;
   performing, with processing circuitry coupled to the memory, a sampling process that comprises:
   determining values of opacity for a plurality of sample positions along a specified path through the volume based on values of the image data at the sample positions, wherein the sample positions are separated by sample intervals;
   determining values of colour/grayscale for the plurality of sample positions along the specified path, based on values of the image data at the sample positions;
   determining whether there is a transition to or from an opacity state at a transition point within a sample interval between the sample points, wherein the opacity state is higher than a predetermined value and wherein the determining of whether there is the transition to or from the opacity state comprises determining, for each of the sample positions, whether the sample interval includes an image data value which corresponds to the transition to said opacity state according to a transfer function to emphasize a characteristic of the rendered image, and if there is the transition to or from the opacity state modifying at least part of the sampling process for at least one of the sample positions such that at least one of the values of colour/grayscale or opacity is determined based on a value determined from the one-dimensional look-up table of the image data at the transition point rather than on a value of the image data at said one of the sample positions; and
   processing the determined values of opacity and colour/grayscale to determine a pixel value for a pixel of a rendered image,
   wherein the determining of whether there is the transition to or from the opacity state comprises determining, for each of the sample positions, whether there is a transition to or from a complete opacity state within the sample interval of the transfer function pertaining at that sample position,
   at least one transition point marker that represents a value of image data value at which the opacity value according to the transfer function exceeds or falls below a threshold is stored in the memory, and
   the determining of whether there is the transition to or from the complete opacity state comprises determining, for each sample position, whether there is a transition point marker within the sample interval for the image data value pertaining at that sample position, points of transition are identified in the one-dimensional look-up table, and presence of the transition point is determined from a comparison of stored transition point data and a range of intensity values that make up the sample interval.

22. A non-transitory computer-readable storage medium storing a computer program that when executed by processing circuitry, the processing circuitry being coupled to a memory that is configured to store a one-dimensional look-up table that includes predetermined values of colour and opacity, the computer program causing the processing circuitry to perform a method comprising:

performing a sampling process that comprises:
determining values of opacity for a plurality of sample positions along a specified path through the volume based on values of the image data at the sample positions, wherein the sample positions are separated by sample intervals;
determining values of colour/grayscale for the plurality of sample positions along the specified path, based on values of the imaged data at the sample positions;
determining whether there is a transition to or from an opacity state at a transition point within a sample interval between the sample points, wherein the opacity state is higher than a predetermined value and wherein the determining of whether there is the transition to or from the opacity state comprises determining, for each of the sample positions, whether the sample interval includes an image data value which corresponds to a transition to said opacity state according to a transfer function to emphasize a characteristic of the rendered image, and if there is the transition to or from the opacity state modifying at least part of the sampling process for at least one of the sample positions such that at least one of the values of colour/grayscale or opacity is determined based on a value determined from the one-dimensional look-up table of the image data at the transition point rather than on a value of the image data at said one of the sample positions; and
processing the determined values of opacity and colour/grayscale to determine a pixel value for a pixel of a rendered image,
wherein the determining of whether there is the transition to or from the opacity state comprises determining, for each of the sample positions, whether there is the transition to or from the complete opacity state within the sample interval of the transfer function pertaining at that sample position, and
at least one transition point marker that represents a value of image data value at which the opacity value according to the transfer function exceeds or falls below a threshold is stored in the memory,
the determining of whether there is the transition to or from the complete opacity state comprises determining, for each sample position, whether there is the transition point marker within the sample interval for the image data value pertaining at that sample position, and
points of transition are identified in the one-dimensional look-up table, and presence of the transition point is determined from a comparison of stored transition point data and a range of intensity values that make up the sample interval.

23. A method of rendering an image from a set of image data representing a volume, the method comprising:
performing a sampling process that comprises:
determining values of opacity for a plurality of sample positions along a specified path through the volume;
determining gradient values for a plurality of gradient positions along the specified path; and
modifying at least part of the sampling process based on the determined values of opacity by, for at least one of the sample positions, making the gradient position lag behind that sample position,
wherein the processing circuitry is further configured to process the determined values of opacity and gradient to determine a pixel value for a pixel of the image.

24. A non-transitory computer-readable storage medium storing a computer program for performing a method comprising:
performing a sampling process that comprises:
determining values of opacity for a plurality of sample positions along a specified path through the volume;
determining gradient values for a plurality of gradient positions along the specified path; and
modifying at least part of the sampling process based on the determined values of opacity by, for at least one of the sample positions, making the gradient position lag behind that sample position,
wherein the processing circuitry is further configured to process the determined values of opacity and gradient to determine a pixel value for a pixel of the image.

* * * * *